(12) United States Patent
Dunn et al.

(10) Patent No.: US 11,566,349 B2
(45) Date of Patent: Jan. 31, 2023

(54) HIGH STRENGTH 3D-PRINTED POLYMER STRUCTURES AND METHODS OF FORMATION

(71) Applicant: U.S. Army Combat Capabilities Development Command, Army Research Laboratory, Adelphi, MD (US)

(72) Inventors: Ryan M. Dunn, Belcamp, MD (US); Kevin R. Hart, Milwaukee, WI (US); Eric D. Wetzel, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 170 days.

(21) Appl. No.: 16/990,164

(22) Filed: Aug. 11, 2020

(65) Prior Publication Data
US 2020/0370206 A1  Nov. 26, 2020

Related U.S. Application Data

(63) Continuation-in-part of application No. 16/814,353, filed on Mar. 10, 2020, which is a continuation of application No. 15/630,175, filed on Jun. 22, 2017, now Pat. No. 10,968,539, and a continuation-in-part
(Continued)

(51) Int. Cl.
| | |
|---|---|
| *D01D 5/08* | (2006.01) |
| *D01D 5/34* | (2006.01) |
| *D01D 10/02* | (2006.01) |
| *D01F 8/04* | (2006.01) |
| *D02J 13/00* | (2006.01) |
| *D01F 8/14* | (2006.01) |
| *B29C 55/00* | (2006.01) |
| *B29C 35/02* | (2006.01) |
| *D01F 8/10* | (2006.01) |
| *D01F 8/18* | (2006.01) |
| *D01F 8/00* | (2006.01) |
| *B33Y 70/00* | (2020.01) |
| *D01D 5/30* | (2006.01) |
| *D01D 5/24* | (2006.01) |
| *B29C 64/106* | (2017.01) |
| *B29C 48/91* | (2019.01) |
| *B29C 71/00* | (2006.01) |
| *B29C 48/16* | (2019.01) |
| *B29C 64/118* | (2017.01) |
| *G02B 6/02* | (2006.01) |
| *B29K 69/00* | (2006.01) |
| *B29K 105/08* | (2006.01) |
| *B29L 31/00* | (2006.01) |
| *B29K 55/02* | (2006.01) |
| *B29K 33/00* | (2006.01) |
| *B29C 71/02* | (2006.01) |

(52) U.S. Cl.
CPC ............... *D01F 8/14* (2013.01); *B29C 35/02* (2013.01); *B29C 48/16* (2019.02); *B29C 48/91* (2019.02); *B29C 55/00* (2013.01); *B29C 64/106* (2017.08); *B29C 64/118* (2017.08); *B29C 71/0009* (2013.01); *B33Y 70/00* (2014.12); *D01D 5/24* (2013.01); *D01D 5/30* (2013.01); *D01F 8/00* (2013.01); *D01F 8/10* (2013.01); *D01F 8/18* (2013.01); *B29C 2071/022* (2013.01); *B29K 2033/12* (2013.01); *B29K 2055/02* (2013.01); *B29K 2069/00* (2013.01); *B29K 2105/08* (2013.01); *B29L 2031/731* (2013.01); *D10B 2321/08* (2013.01); *D10B 2321/10* (2013.01); *D10B 2331/04* (2013.01); *G02B 6/02033* (2013.01)

(58) Field of Classification Search
CPC ....... B29C 48/16; B29C 48/91; B29C 64/118; B29C 71/0009; B29C 2071/022; D01D 5/08; D01D 5/34; D01D 10/02; D01F 8/04; D02J 13/00
USPC .... 264/139, 172.15, 173.12, 173.16, 211.16, 264/211.17, 235, 308, 341
See application file for complete search history.

(56) References Cited

U.S. PATENT DOCUMENTS

| | | | |
|---|---|---|---|
| 4,627,950 A | * | 12/1986 | Matsui ...................... D01F 8/04 264/139 X |
| 5,121,329 A | | 6/1992 | Crump |
| 5,362,427 A | | 11/1994 | Mitchell |

(Continued)

FOREIGN PATENT DOCUMENTS

| | | | | |
|---|---|---|---|---|
| WO | WO-9523539 A1 | * | 9/1995 | ............. B24D 13/06 |

OTHER PUBLICATIONS

Geoff Barton, Martijn A. van Eijkelenborg, Geoffrey Henry, Maryanne C.J. Large, and Joseph Zagari. "Fabrication of microstructured polymer optical fibers." Optical Fiber Technology. v10 p. 325-335. 2004.

(Continued)

*Primary Examiner* — Leo B Tentoni
(74) *Attorney, Agent, or Firm* — Christos S. Kyriakou

(57) ABSTRACT

A polymer body includes a first thermoplastic polymer, and a second thermoplastic polymer. The first thermoplastic polymer and the second thermoplastic polymer form a continuous solid structure. The first thermoplastic polymer forms an external supporting structure that at least partially envelops the second thermoplastic polymer. A first flow temperature of the first thermoplastic polymer is at least 10° C. higher than a second flow temperature of the second thermoplastic polymer. The first thermoplastic polymer may be removable by exposure to a selective solvent.

14 Claims, 24 Drawing Sheets

Related U.S. Application Data of application No. 15/081,048, filed on Mar. 25, 2016, now Pat. No. 11,001,945.

(60) Provisional application No. 62/885,877, filed on Aug. 13, 2019, provisional application No. 62/885,554, filed on Aug. 12, 2019, provisional application No. 62/817,161, filed on Mar. 12, 2019, provisional application No. 62/139,313, filed on Mar. 27, 2015.

(56) References Cited

U.S. PATENT DOCUMENTS

| | | | |
|---|---|---|---|
| 5,593,778 | A | 1/1997 | Kondo |
| 7,150,616 | B2 | 12/2006 | Haynes et al. |
| 10,968,539 | B2 | 4/2021 | Wetzel et al. |
| 11,001,945 | B2 | 5/2021 | Wetzel et al. |
| 2009/0003834 | A1 | 1/2009 | Saito |
| 2009/0253323 | A1 | 10/2009 | Mueller |
| 2012/0329352 | A1* | 12/2012 | Yoshida ............... D04H 1/5412 442/364 |
| 2014/0374106 | A1 | 12/2014 | Zhu |
| 2015/0329991 | A1 | 11/2015 | Masuda |

OTHER PUBLICATIONS

Hart, S.D., Maskaly, G.R., Temelkuran, B., Prideaux, P., Joannopoulos, J.D., Fink, Y., "External Reflection from Omnidirectional Dielectric Mirror Fibers," Science 296, 510-513, Apr. 2002.

Temelkuran, B., Hart, S.D., Benoit, G., Joannopoulos, J.D., Fink, Y., "Wavelength Scalable Optical Fibers for CO2 Laser Transmission," Nature 420, 650-653, Dec. 2002.

Bayindir, M., Sorin, F., Hart, S., Shapira, O., Joannopoulos, J.D., Fink, Y., "Metal-Insulator Semiconductor Optoelectronic Fibres," Nature, 431, 826-829, Oct. 2004.

Bayindir, M., Shapira, O., Saygin-Hinczewski , D., Viens, J., Abouraddy, A.F., Joannopoulos, J.D., Fink, Y., "Integrated Fibers for Self Monitored Optical Transport," Nature Materials, 4, 820-824, Oct. 2005.

Abouraddy, A. F., Bayindir, M., Benoit, G., Hart, S. D., Kuriki, K., Orf, N., Shapira, O., Sorin, F., Temelkuran, B., Fink, Y., "Towards Multimaterial Multifunctional Fibres that See, Hear, Sense and Communicate," (invited review paper) Nature Materials 6, No. 5, 336-347, May 2007.

Alexander Gumennik, Alexander M. Stolyarov, Brent R. Schell, Chong Hou, Guillaume Lestoquoy, Fabien Sorin, William McDaniel, Aimee Rose, John D. Joannopoulos, and Yoel Fink. "All-in-fiber chemical sensing." Advanced Materials. v24 n45 p. 6005-6009. 2012.

Guillaume Lestoquoy, Noemie Chocat, Zheng Wang, John D. Joannopoulos, and Yoel Fink. "Fabrication and characterization of thermally drawn fiber capacitors." Appl. Phys. Lett. v102 n152908. 2013.

S. C. Xue, M. C. J. Large, G. W. Barton, R. I. Tanner, L. Poladian, and R. Lwin. "Role of material properties and drawing conditions in the fabrication of microstructured optical fibers." J. Lightwave Tech., v24 n2 p. 853-860. 2006.

* cited by examiner

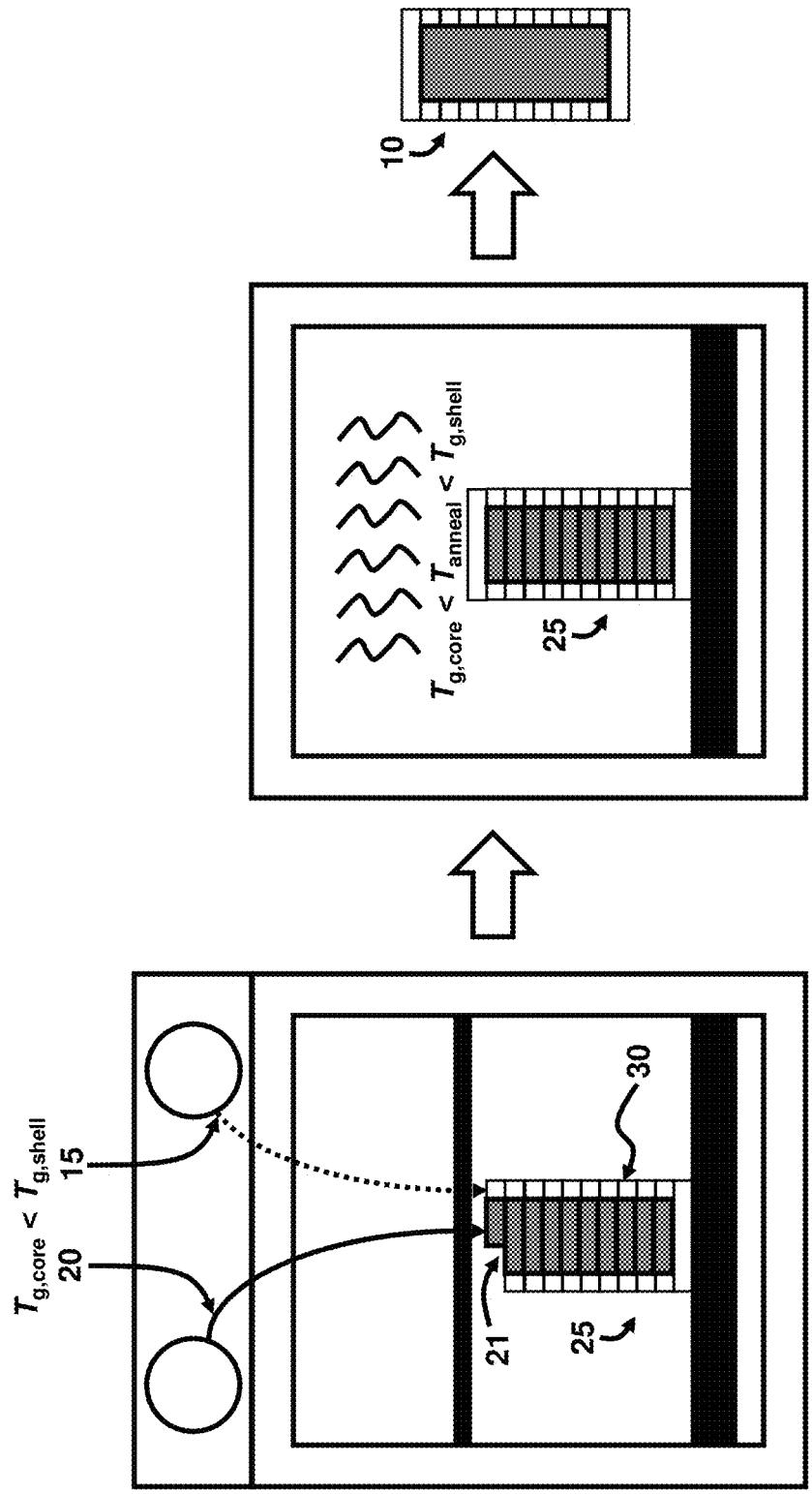

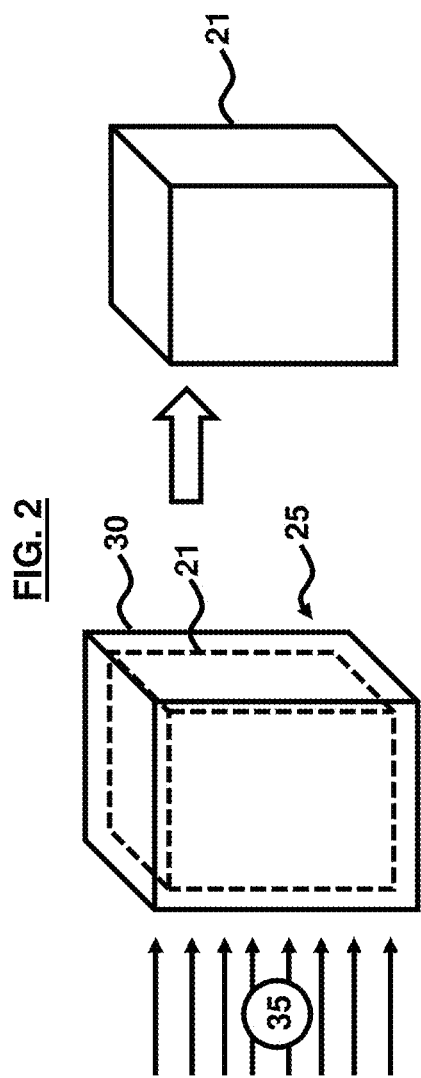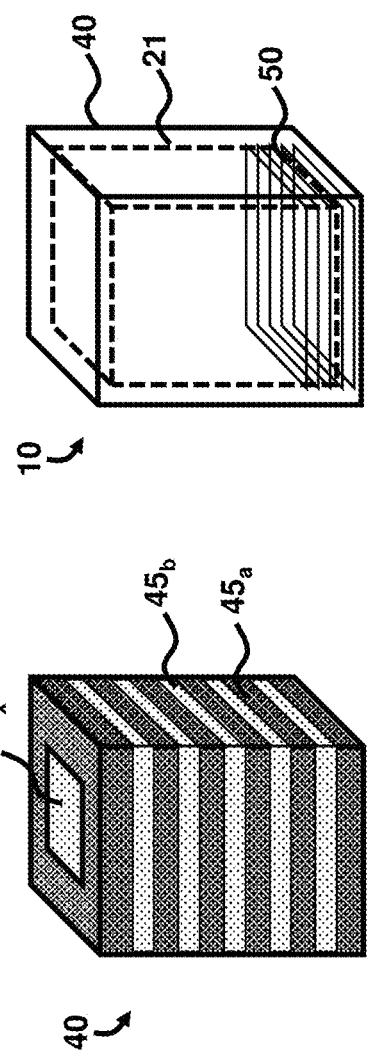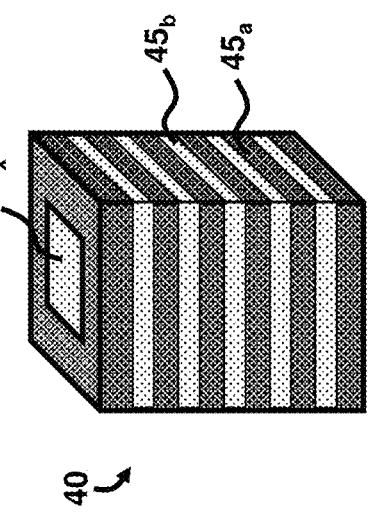

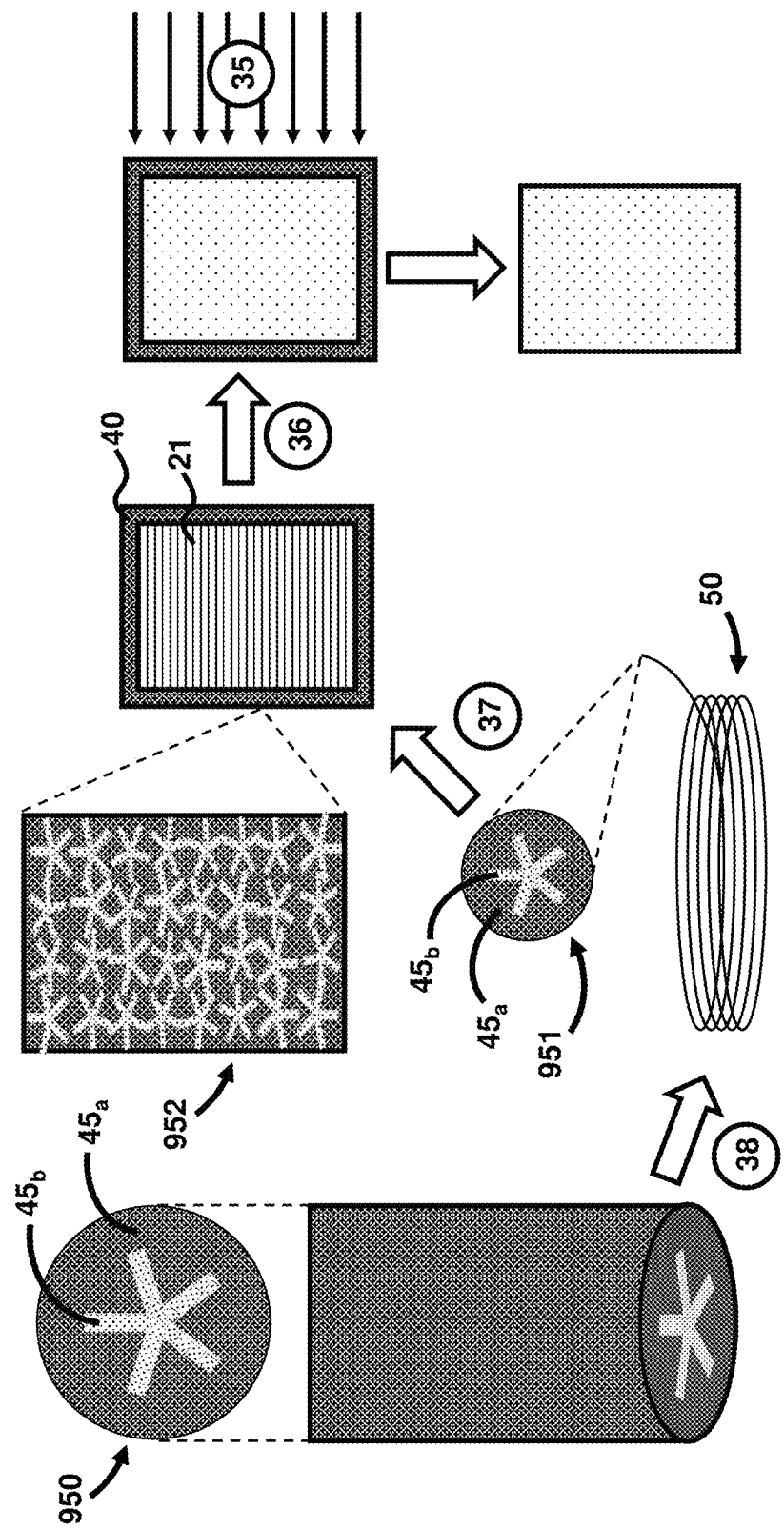

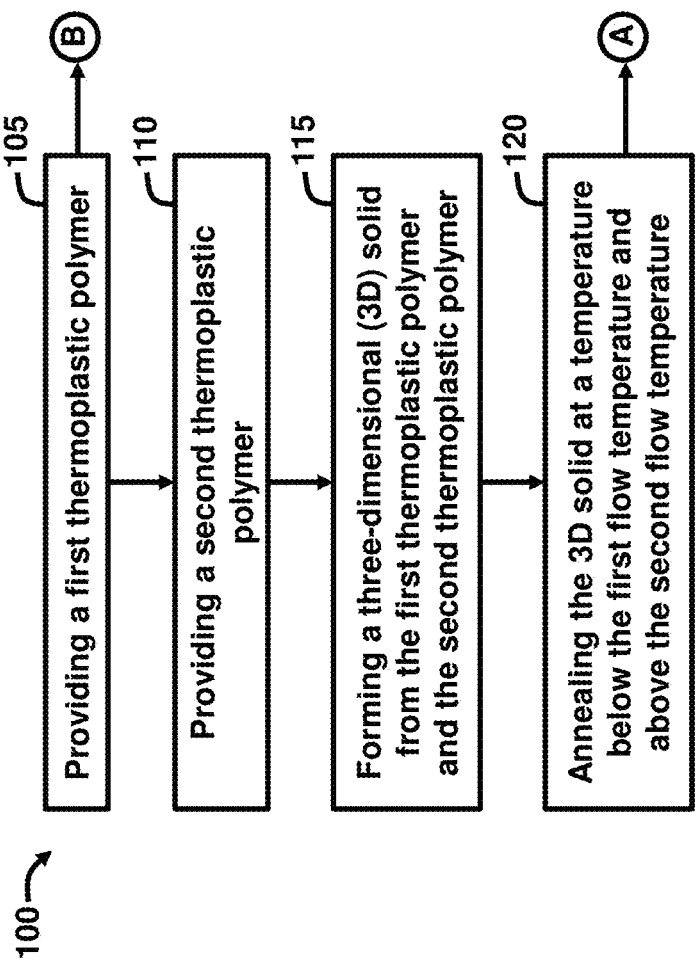

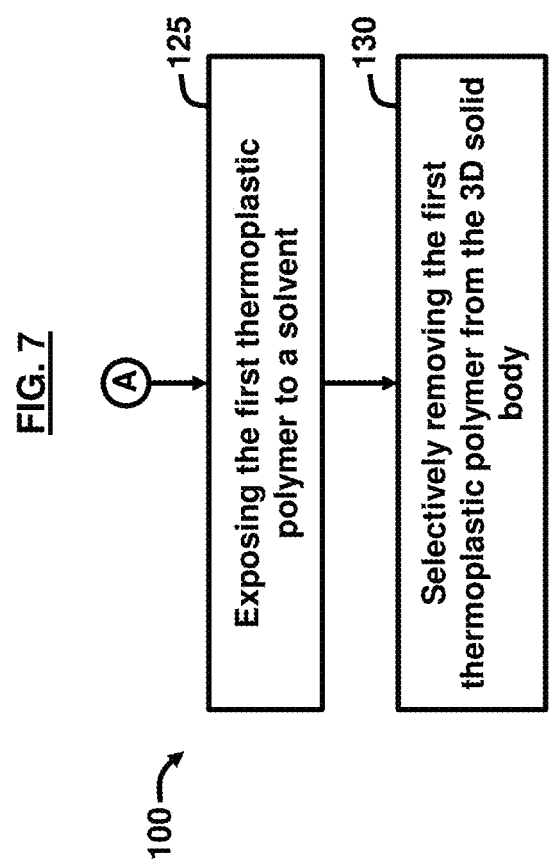

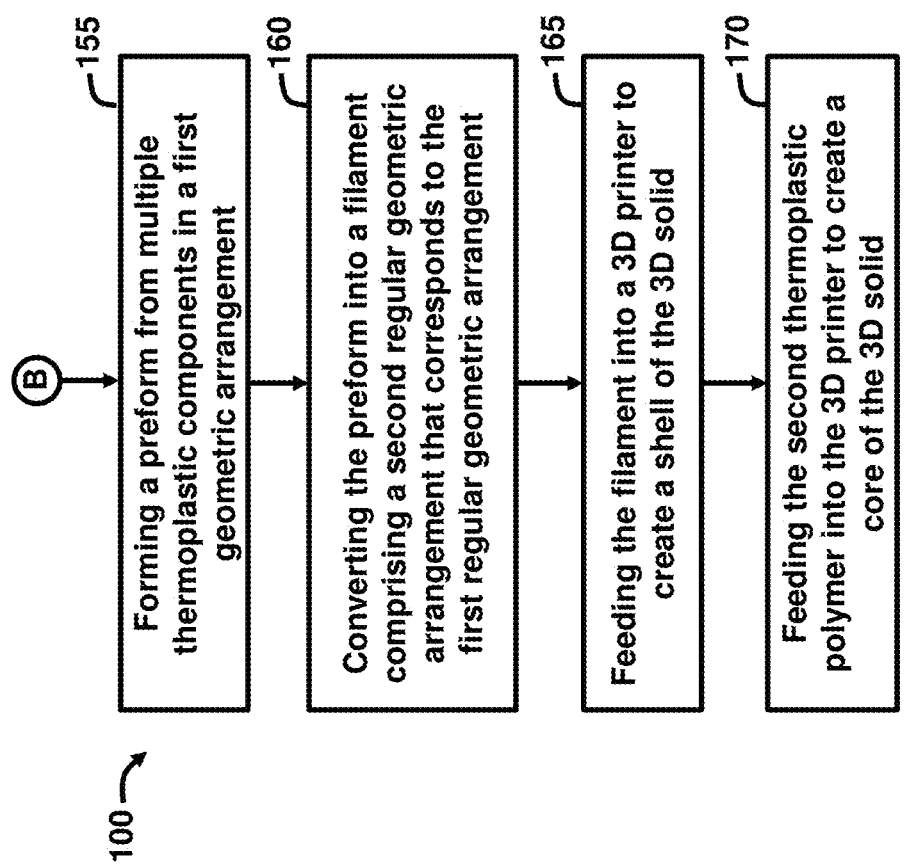

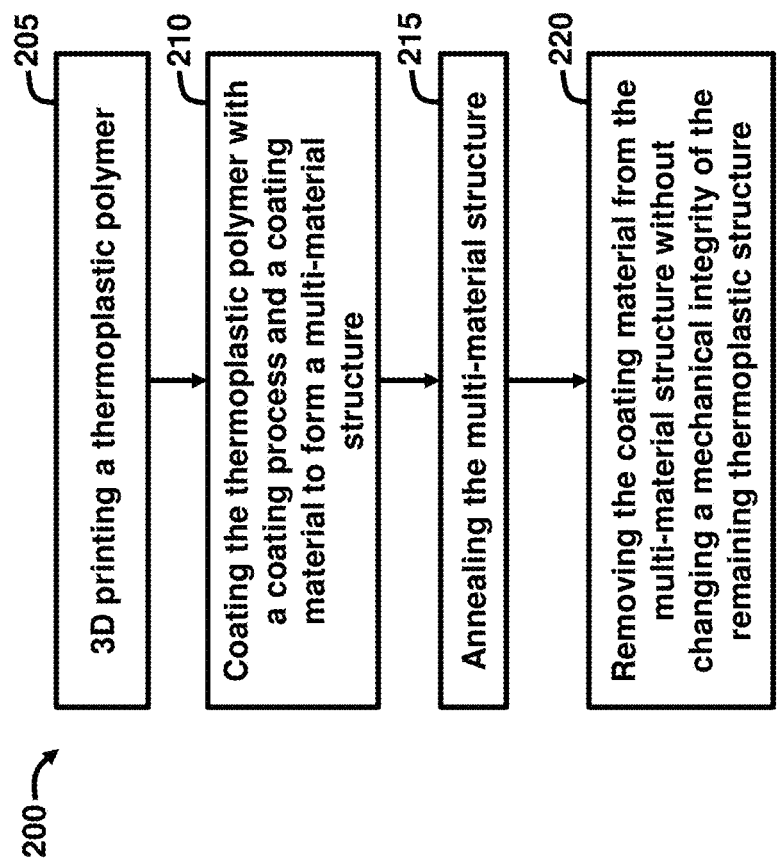

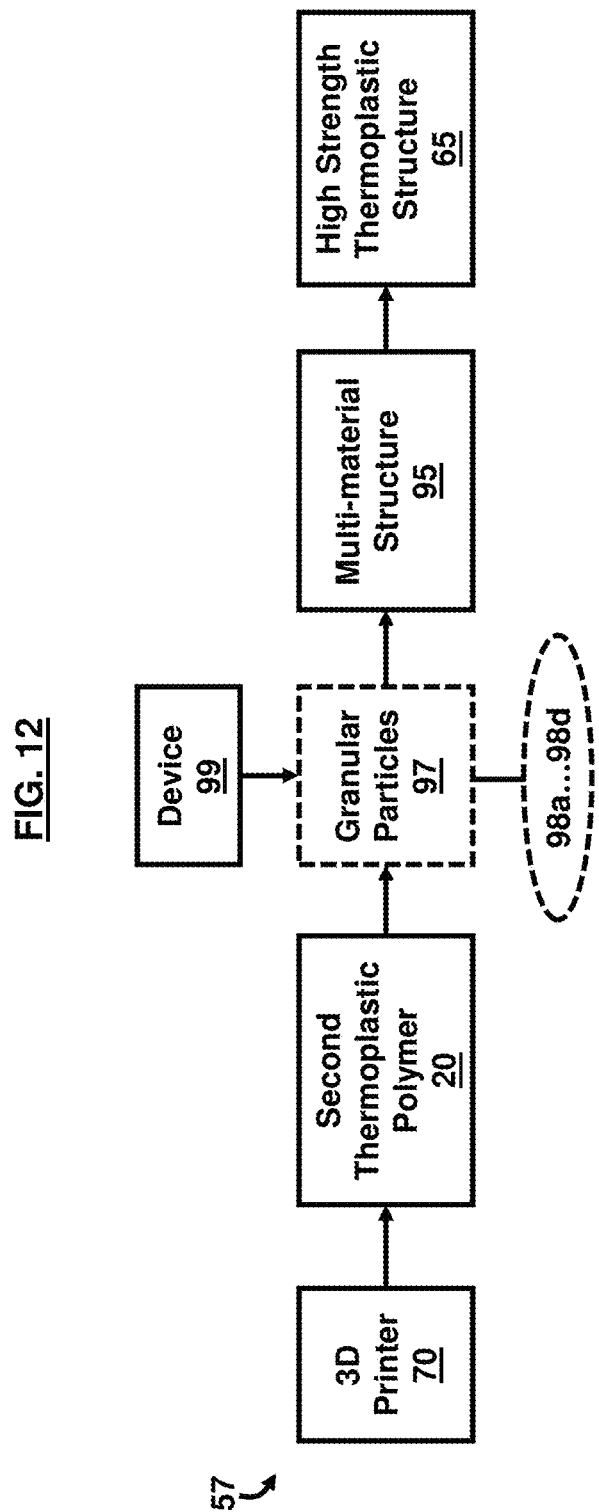

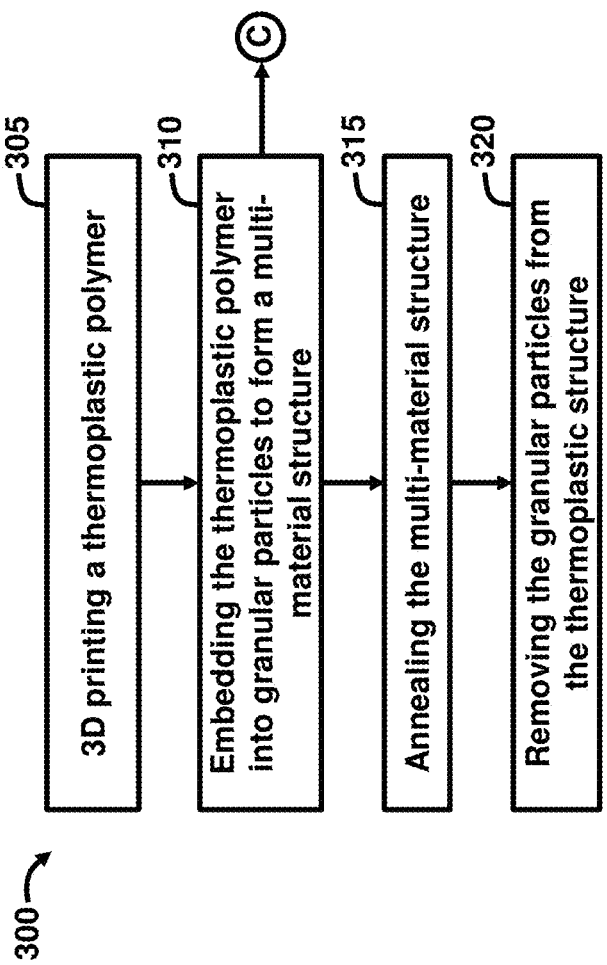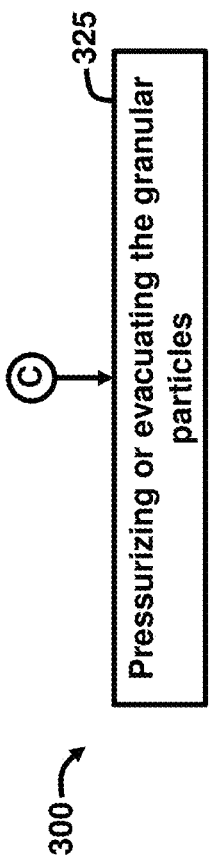

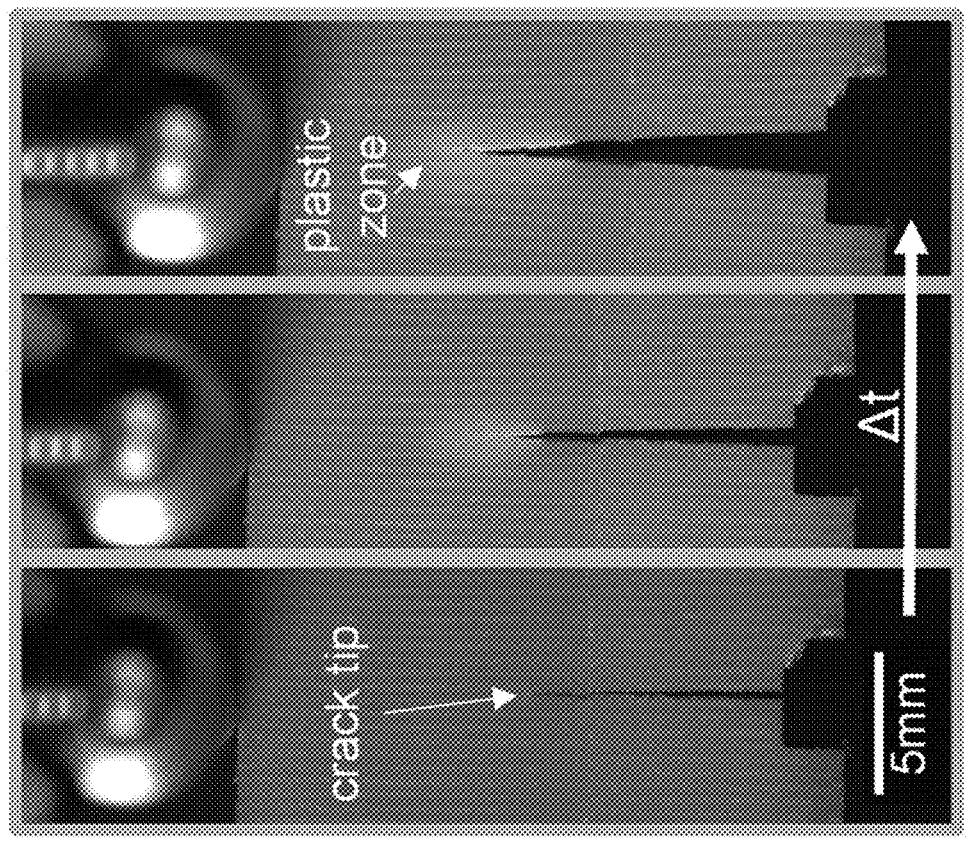

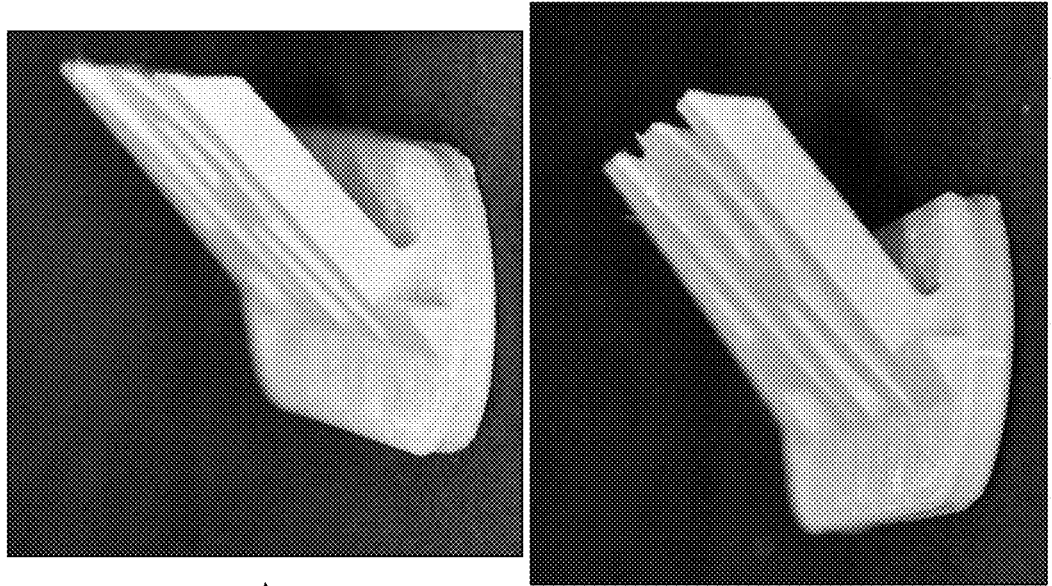
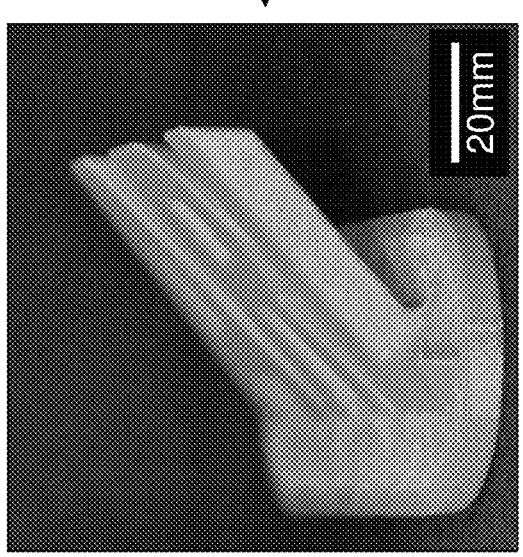

HIGH STRENGTH 3D-PRINTED POLYMER STRUCTURES AND METHODS OF FORMATION

CROSS-REFERENCE TO RELATED APPLICATION(S)

This application claims the benefit of U.S. Provisional Patent Application No. 62/885,554 filed on Aug. 12, 2019 and U.S. Provisional Patent Application No. 62/885,877 filed on Aug. 13, 2019, which are incorporated herein by reference in their entireties. This non-provisional patent application is a continuation-in-part application of U.S. Non-Provisional application Ser. No. 16/814,353, filed on Mar. 10, 2020, which claims the benefit of U.S. Provisional Application No. 62/817,161, titled "Geometrically Regular, Multi-Material Polymer Filament for Three-Dimensional Printing Co-Drawn with Inextensible Fibers" filed on Mar. 12, 2019, which are both hereby incorporated by reference herein including all attachments and papers filed with U.S. Provisional Application No. 62/817,207 which claims priority to and the benefit of U.S. Non-Provisional application Ser. No. 15/630,175, filed on Jun. 22, 2017, which claims the benefit of U.S. Provisional Application No. 62/353,207, titled "Geometrically Regular, Multi-Material Polymer Filament for Three-Dimensional Printing Co-Drawn with Inextensible Fibers" filed on Jun. 22, 2016, which are both hereby incorporated by reference herein including all attachments and papers filed with U.S. Provisional Application No. 62/353,207 and U.S. Non-Provisional application Ser. No. 15/630,175. This non-provisional patent application is also a continuation-in-part of U.S. Non-Provisional application Ser. No. 15/081,048, titled "Geometrically Regular, Multi-Material Polymer Filament for Three-Dimensional Printing" filed on Mar. 25, 2016 that claims priority to and the benefit of U.S. Provisional Application No. 62/139,313, titled "Geometrically Regular, Multi-Material Polymer Filament for Three-Dimensional Printing" filed on Mar. 27, 2015. All of which are hereby incorporated by reference herein including all attachments and papers filed with U.S. Provisional Application Nos. 62/139,313 and 62/353,207 and U.S. Non-Provisional application Ser. Nos. 15/081,048 and 15/630,175.

GOVERNMENT INTEREST

The embodiments herein may be manufactured, used, and/or licensed by or for the United States Government without the payment of royalties thereon.

BACKGROUND

Technical Field

The embodiments herein generally relate to polymer structures, and more particularly to 3D-printed polymer structures.

Description of the Related Art

Additive manufacturing provides an opportunity for reduced logistics by carrying digital files and printers, rather than physical replacement parts, to maintain equipment. Additive manufacturing printers and print materials for expeditionary applications need to be extremely robust, environmentally stable, and ideally low cost. Most conventional print technologies (e.g., laser powder methods, UV-curable polymers, etc.) do not meet these requirements.

Fused filament fabrication (FFF) is the most widely implemented additive manufacturing (e.g., 3D printing) technique due in part to the relatively low cost of devices and feedstock. The FFF process involves feeding a long thermoplastic filament into a heated head that melts and extrudes a fine trace of polymer onto a work surface. The work surface and/or the deposition head provide three linear axes of computer-controlled motion, enabling digital solid models to be produced as polymeric 3D solids.

During the FFF process, each layer is printed by extruding continuous lines of thermoplastic polymer onto a partially cooled, previously deposited layer. As a new polymer is deposited onto the previous layer, their material interface rises above a material softening point for a few seconds, allowing some degree of polymer flow, wetting, and molecular reptation across the interface. This material softening point during the FFF process is usually a glass transition temperature ($T_g$) or melt temperature ($T_m$). Wetting mitigates physical layer gaps and reptation forms a strong weld where the layers are in contact. The residence times, temperatures, and compaction pressures at this interface are generally not sufficient to form a high strength bond, so interfacial strength is significantly less than strength values for an injection molded polymer. This poor inter-laminar, or "z-direction", bond strength (i.e., poor mechanical properties between layers) in FFF parts is a critical limitation that prevents their use in many engineering applications.

Some conventional techniques to improve the z-direction strength include using a 5-axis system allowing for three-dimensional print paths, rather than being restricted to a single z-layer, yielding up to five-fold z-direction strength improvements. Other techniques utilize carbon nanotube (CNT) coated filaments to create FFF parts that are post-processed with microwave radiation to promote polymer reptation at every interface. Still other techniques print in a controlled environment with the absence of oxygen and moisture in order to increase the tensile strength of the parts. Cooling of the previous layer during an FFF print is partially responsible for the weak interface. Interlayer bond toughness in ABS parts can be improved by locally heating the previous layer with a heating element moving in advance of the toolpath. However, these techniques typically require specialized hardware or material feedstocks, which are not available in commercial off-the-shelf FFF printers. A variety of print parameter optimizations, including deposition temperature, layer thickness, and line width have been attempted in the conventional solutions. However, while these techniques have yielded improvements to z-direction strength, they have not reached the strength values of injection molded parts. Toolpath optimization using non-traditional slicing methods which consider the use of the part can also increase the strength of FFF parts. A somewhat related technique is the "cold vapor polishing" technique, in which FFF parts are exposed to solvent vapor (usually acrylonitrile butadiene styrene (ABS) parts exposed to acetone vapor) to lower the $T_g$ of the outside surface of the polymer, causing it to flow and smooth surface features due to surface tension. This technique is primarily a surface treatment, which appears to affect only the outer surface roughness of the part, without a significant increase in mechanical properties.

FFF parts can be annealed to high strength by exposing them to elevated temperatures (i.e., above the flow temperature) for extended periods of time (i.e., hours to days), as described in Hart, K., et al., "Increased Fracture Toughness of Additively Manufactured Amorphous Thermoplastics Via Thermal Annealing," Polymer, Vol. 144, May 23, 2018, pp. 192-204, the complete disclosure of which, in its entirety, is herein incorporated by reference. This annealing process provides the time and polymer mobility necessary for full healing of the z-direction interface. By thermally annealing the FFF parts, the z-direction strength may be enhanced by increasing the fracture toughness between printed layers, transforming brittle interfaces into tough interfaces exhibiting extensive plastic deformation during crack propagation. Capillary wetting of the polymer-polymer interface may be the key rate limiting mechanism during annealing.

Unfortunately, annealing conventional FFF parts above their softening points can lead to significant distortion of part geometry due to two effects: creep (sagging and flow due to gravity) and thermal stress relaxations from the print process. Stress relaxations are thought to be associated with deposition-induced polymer orientation, which relaxes upon annealing and leads to contraction of the part along deposition directions. Geometric changes can be limited by annealing in fixtures or molds. However, a matched mold approach is not generally useful for annealing FFF parts because a custom mold would have to be fabricated for every FFF part, which is impractical, and thus eliminates many of the benefits of freeform additive manufacturing. Therefore, techniques are needed to allow for a printed part to be annealed to high strength, without loss in geometric accuracy, and without requiring prohibitive additional fabrication or post-processing steps.

SUMMARY

In view of the foregoing, an embodiment herein provides a polymer body comprising a first thermoplastic polymer; and a second thermoplastic polymer, wherein the first thermoplastic polymer and the second thermoplastic polymer form a continuous solid structure, wherein the first thermoplastic polymer forms an external supporting structure that at least partially envelops the second thermoplastic polymer, and wherein a first flow temperature of the first thermoplastic polymer is at least 10° C. higher than a second flow temperature of the second thermoplastic polymer. The first thermoplastic polymer may be configured to be removed from the second thermoplastic polymer by exposure to a selective solvent that does not degrade the second thermoplastic polymer. The selective solvent may comprise any of water, an organic solvent, an inorganic solvent, limonene, ammonia, supercritical carbon dioxide, an acid, and a base.

The first thermoplastic polymer may comprise any of polyvinyl alcohol (PVA), poly(ethylene oxide) (PEO), poly(ethylene glycol) (PEG), polylactic acid (PLA), high impact polystyrene (HIPS), polyethylene glycol (PEG), polyvinyl pyrrolidone (PVP), poly(vinyl methyl ether), poly-vinylpyrrolidone, carboxy-vinyl polymers, poly methacrylic acid, polyacrylic acid (PAA), poly(n-isopropylacrylamide) (PNIPAm), polyacrylamides (PAAmm), N-(2-hydroxypropyl) methacrylamid (HPMA), divinyl ether-maleic anhydride (DIVEMA), polyoxazoline, polyphosphates, polyphsphazenes, cellulose, cellulose ether, pectin, polyether; and copolymers or blends containing one or more of these components. The first thermoplastic polymer may comprise a multi-component structure.

Another embodiment provides a multi-component thermoplastic filament comprising a first thermoplastic component; and a second thermoplastic component, wherein the first thermoplastic component and second thermoplastic component comprise a regular geometric arrangement, and wherein the first thermoplastic component is configured to be removed by exposure to a selective solvent. The first thermoplastic component may comprise a first flow temperature and the second thermoplastic component may comprise a second flow temperature, wherein the second flow temperature may be at least 10° C. higher than the first flow temperature. The regular geometric arrangement may comprise an interlocking geometric arrangement. The regular geometric arrangement may comprise a periodic geometric arrangement. A geometry of the second thermoplastic component may at least partially confine the first thermoplastic component so that the second thermoplastic component is restricted from release from a filament structure.

Another embodiment provides a method for creating a high strength thermoplastic body, the method comprising providing a first thermoplastic polymer; providing a second thermoplastic polymer; forming a three-dimensional (3D) solid from the first thermoplastic polymer and the second thermoplastic polymer, wherein the 3D solid comprises a continuous solid structure comprising the second thermoplastic polymer, wherein the first thermoplastic polymer forms an external supporting structure that at least partially envelops the second thermoplastic polymer, and wherein a first flow temperature of the first thermoplastic polymer is at least 10° C. higher than a second flow temperature of the second thermoplastic polymer; and annealing the 3D solid at a temperature below the first flow temperature and above the second flow temperature. The method may comprise exposing the first thermoplastic polymer to a solvent; and selectively removing the first thermoplastic polymer from the 3D solid. The 3D solid may be formed by a 3D printing process. The 3D solid may be formed by a fused filament fabrication process.

The method may comprise forming a multi-component first thermoplastic filament comprising a regular geometric arrangement, wherein at least one of component of the multi-component first thermoplastic filament has a flow temperature at least 10° C. higher than a second flow temperature of the second thermoplastic polymer; feeding the filament into a 3D printer to create a shell of the 3D solid; and feeding the second thermoplastic polymer into the 3D printer to create a core of the 3D solid. The method may comprise forming the multi-component first thermoplastic filament via an extrusion process. The method may comprise forming a preform from multiple thermoplastic components in a first regular geometric arrangement; and converting the preform into a filament comprising a second regular geometric arrangement that corresponds to the first regular geometric arrangement. The method may comprise exposing the shell to a solvent; and selectively removing the shell from the 3D solid.

Another embodiment provides a method for creating a high strength thermoplastic structure, the method comprising three-dimensional (3D) printing a thermoplastic polymer; coating the thermoplastic polymer with a coating material to form a thermoplastic structure; annealing the thermoplastic structure; and removing the coating material from the thermoplastic structure without changing a mechanical integrity of a remaining portion of the thermoplastic structure. The coating material may comprise any of another thermoplastic polymer in a solvent or suspension bath, a reversible thermosetting polymer, a plaster-based material, a gelatin, a salt-based material, a starch-based material, and a sugar-based material.

Another embodiment provides a method for creating a high strength thermoplastic structure, the method comprising three-dimensional (3D) printing a thermoplastic polymer; embedding the thermoplastic polymer into granular particles to form a thermoplastic structure; annealing the thermoplastic structure; and removing the granular particles from the thermoplastic structure. The granular particles may comprise any of sand, monodisperse glass beads, polydisperse glass beads, metal beads, salt, sugar, ceramic beads, high temperature polymer beads, or natural materials such as walnut shells or cherry pits; or a binder. The method may comprise pressurizing or evacuating the granular particles.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 1 is a schematic diagram illustrating a polymer body formed with a first thermoplastic polymer and a second thermoplastic polymer, according to an embodiment herein;

FIG. 2 is a schematic diagram illustrating removing the first thermoplastic polymer from the polymer body of FIG. 1, according to an embodiment herein;

FIG. 3 is a schematic diagram illustrating aspects of the first thermoplastic polymer of the polymer body of FIG. 1, according to an embodiment herein;

FIG. 4A is a schematic diagram illustrating connections between the first thermoplastic polymer and the second thermoplastic polymer of the polymer body of FIG. 1, according to an embodiment herein;

FIG. 4B is a schematic diagram illustrating using a multi-component filament to create a polymer body, according to an embodiment herein;

FIG. 6 is a flow diagram illustrating a method creating a high strength thermoplastic structure using a first thermoplastic polymer and a second thermoplastic polymer, according to an embodiment herein;

FIG. 7 is a flow diagram illustrating a method of removing a first thermoplastic polymer from a 3D solid, according to an embodiment herein;

FIG. 9B is a flow diagram illustrating a method of creating a shell and core of a 3D solid by forming multi-component filament via creation of a multi-component preform, and then thermal drawing that preform into filament, according to an embodiment herein;

FIG. 11 is a flow diagram illustrating a method of creating a high strength thermoplastic structure using a coating material, according to an embodiment herein;

FIG. 12 is a block diagram illustrating a system for creating a high strength thermoplastic structure using granular particles, according to an embodiment herein;

FIG. 13 is a flow diagram illustrating a method of creating a high strength thermoplastic structure using granular particles, according to an embodiment herein;

FIG. 14 is a flow diagram illustrating a method of preparing the granular particles, according to an embodiment herein;

FIG. 19C is a magnified optical image illustrating ductile crack propagation and formation of a plastic zone in the vicinity of the crack tip during testing of an annealed specimen, according to an embodiment herein;

FIG. 21A is an image of an ABS sample before and after annealing, according to an embodiment herein;

FIG. 21B is an image of a PC-shelled ABS sample before and after annealing, according to an embodiment herein.

DETAILED DESCRIPTION

Figure 5:
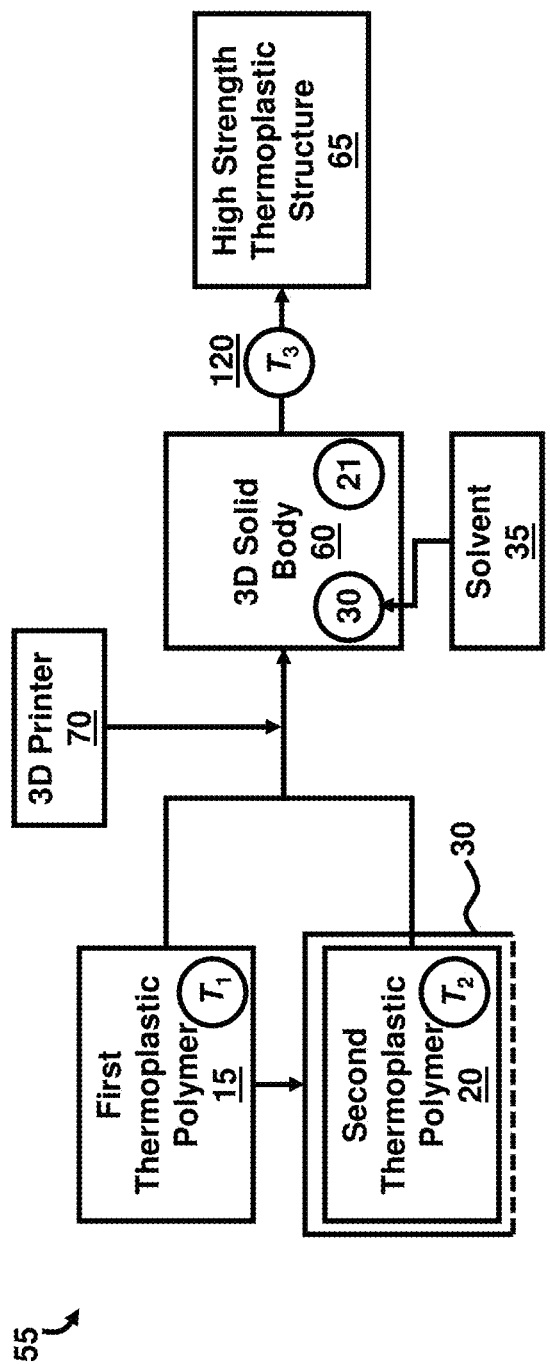
FIG. 5 is a block diagram illustrating a system for creating a high strength thermoplastic structure using a first thermoplastic polymer and a second thermoplastic polymer, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As used herein the term "flow temperature" is defined as any characteristic polymer temperature, such as a softening (i.e. $T_g$, glass transition) or melting point ($T_m$) that can be used to compare the thermal properties of different polymers and which in part determines appropriate drawing, printing, annealing, wetting, and healing process conditions for a given polymer system. The flow temperature provides information on the polymer's ability to form a high strength bond with other polymer surfaces, as well as its ability to maintain loads and hold shape. Generally speaking, a polymer below its flow temperature will be more likely to hold shape, and less likely to flow and form a high strength bond via interfacial healing; a polymer above its flow temperature will be more likely to flow and form a high strength bond, but less likely to hold its shape.

As used herein, the term "preform" is a three dimensional body of two or more materials with differing chemical, mechanical, physical, or thermal properties arranged in a regular or irregular fashion and suitably dimensioned so as to allow the preform to be drawn into the form of a filament.

As used herein, the term "thermal drawing" is a process for progressively heating a preform so that at least a portion of the preform exceeds a relevant flow temperature; and subjecting the preform to tension, so that the heated section necks down into filament that can be continuously produced and collected. The thermal drawing process generally leads to filament with a material arrangement similar to the arrangement of materials within the preform, but at a smaller size scale.

As used herein, the term "annealing" refers to subjecting a part to elevated temperature for an extended period of time. The annealing temperature is generally higher than the flow temperature of one of the material constituents of the part. Annealing times can be seconds, minutes, hours, days, or weeks. Airflow, convection, thermal radiation, and immersion baths can all be used to enhance annealing. Liquid or vapor solvents and plasticizers may also be introduced to enhance the annealing process.

The embodiments herein provide a shell print technique in which support structures are printed to maintain the part geometry during annealing, allowing for the creation of 3D parts with high strength and geometric accuracy, which improves the interlayer mechanical performance of FFF parts. The embodiments herein utilize a dual-material print head to encase a low glass transition temperature ($T_g$) polymer such as ABS within a high-$T_g$ shell such as polycarbonate. The resulting structure, when annealed at a temperature between the core and shell polymer $T_g$ values, creates a tough interior with high inter-laminar strength while retaining the as-printed three-dimensional geometry of the part. Accordingly, the embodiments herein provide a technique that significantly improves 3D printed parts by printing an integral higher $T_g$ shell followed by thermal annealing. According to various examples, a thin shell remains integrated with the part, or a solvent-soluble shell is provided, or a two-component shell containing a solvent-soluble material and a high $T_g$ non-soluble material is provided. The embodiments herein may be used in a wide range of manufacturing and prototyping applications for rapidly creating low cost, mechanically robust, thermoplastic parts. Referring now to the drawings, and more particularly to FIGS. 1 through 22, where similar reference characters denote corresponding features consistently throughout the figures, there are shown preferred embodiments. In the drawings, the size and relative sizes of components, layers, and regions, etc. may be exaggerated for clarity.

FIG. 1 illustrates a schematic diagram of a polymer body 10 comprising a first thermoplastic polymer 15, and a second thermoplastic polymer 20. The first thermoplastic polymer 15 and the second thermoplastic polymer 20 form a continuous solid structure 25. Additionally, the first thermoplastic polymer 15 forms an external supporting shell structure 30 that at least partially envelops the second thermoplastic polymer 20 which forms a core 21. The first flow temperature $T_g$,shell of the first thermoplastic polymer 15 is at least 10° C. higher than a second flow temperature $T_g$, core of the second thermoplastic polymer 20.

In an example, the first flow temperature $T_{g,shell}$ of the first thermoplastic polymer 15 may be approximately 150° C. and the second flow temperature $T_{g,core}$ of the second thermoplastic polymer 20 may be approximately 105° C. The first thermoplastic polymer 15 may comprise polycarbonate (PC) and the second thermoplastic polymer 20 may comprise ABS, according to some examples. Any of the first thermoplastic polymer 15 and the second thermoplastic polymer 20 may optionally include one or more of the following materials: acrylonitrilebutadienestyrene (ABS); high density polyethylene (HDPE); low density polyethylene (LDPE); polyamide (Nylon); polyamide imide (PAI); polyarylate (PAR); polyaryletherketone (PAEK); polybutylene terephthalate (PBT); polycarbonate (PC); polyester; polyether sulfone (PES); polyetherketoneketone (PEKK); polyetheretherketone (PEEK or PK); polyetherimide (PEI, ULTEM); polyetherketone (PEK); polyetherketonetherketoneketone (PEKEKK); polyethlyene (PE); polyethylene terephthalate (PET); polyimide (PI); polylactic acid (PLA); polymethyl methacrylate (PMMA); polyoxymethylene (POM); polyphenylene oxide (PPO); polyphenylene sulfide (PPS); polyphenylsulfone (PPSU); polyphthalamide (PPA); polyphthalate carbonate (PPC); polypropylene (PP); polystyrene (PS); polysulfone (PSF); polyurethane (PU); polyvinyl chloride (PVC); polyvinylidene fluoride (PVDF); styrene acrylonitrile (SAN); styrene maleic anhydride (SMA); ultrahigh molecular weight polyethylene (UHMWPE); other thermoplastics, thermoplastic polymers and melt processable polymers; and copolymers or blends containing one or more of these components.

The first thermoplastic polymer 15 and the second thermoplastic polymer 20 may be 3D-printed using a dual head printer, for example, so that the supporting shell structure 30 will be produced as an integral component to the core 21 during the annealing process. The first thermoplastic polymer 15 constitutes the supporting shell structure 30 of the continuous solid structure 25 and the second thermoplastic polymer 20 constitutes the core 21 of the continuous solid structure 25. The continuous solid structure 25 can be annealed in an oven, for example, under time-temperature conditions that allow full strength development in the second thermoplastic polymer 20, while the first thermoplastic polymer 15 remains at a temperature below its $T_g$, providing dimensional stability and maintaining the shape of the part. As such, the first thermoplastic polymer 15 remains geometrically stable at the annealing temperature while the second thermoplastic polymer 20 undergoes full wetting and reptation. In an example, PC, which may be used for the first thermoplastic polymer 15, has a glass transition temperature $T_g$ of approximately 140° C. and is geometrically stable at 135° C. In an example, ABS, which may be used for the second thermoplastic polymer 20, has a glass transition temperature $T_g$ of approximately 110° C. and fully anneals in approximately 72 hours at 135° C. This technique requires no specialized equipment other than a 3D printer with multi-material capabilities and an oven. In an example, the annealing can take place at a temperature of 105° C.<$T_{anneal}$<150° C. for hours or days, so that the second thermoplastic polymer 20 interfaces can heal to a high strength, while the first thermoplastic polymer 15 remains as a rigid elastic solid to maintain part geometry during annealing. The polymer body 10 may be implemented in any suitable geometry of any complexity or interior cavities. Accordingly, the shapes and configurations of the polymer body 10 depicted in the drawings are merely examples and the embodiments herein are not restricted to these specific shapes and configurations. In another embodiment, heating during annealing can be provided via irradiation, heated air, induction heating, or immersion in a heated bath. For induction, heating susceptor materials such as metals or magnetic oxides may be embedded into the part core to couple with the electromagnetic heating source.

FIG. 2, with reference to FIG. 1, is a schematic diagram illustrating that the supporting shell structure 30 may be configured to be removed from the polymer core 21 by exposure to a selective solvent 35 that does not degrade the second thermoplastic polymer 20. As such, the selective solvent 35 dissolves and/or softens the supporting shell structure 30 for removal without affecting the second thermoplastic polymer 20. In an example, the selective solvent 35 may comprise any of water, an organic solvent, an inorganic solvent, limonene, ammonia, supercritical carbon dioxide, an acid, and a base. The solvent may be heated, flowed, agitated, sonicated, sprayed, emulsified, pressurized, or evacuated to enhance the dissolution process. According to an example, the selective solvent 35 may comprise boiling water, which may provide a cost-effective and environmentally safe technique to remove the supporting shell structure 30 from the core 21. The material of the supporting shell structure 30 may completely dissolve into the solvent, or break up into small suspended particles, or may simply soften to the point where it can be easily removed with mechanical agitation or manual extraction. Examples of first thermoplastic polymer 15 that may be readily removed by a solvent include any of polyvinyl alcohol (PVA), poly(ethylene oxide) (PEO), poly(ethylene glycol) (PEG), polylactic acid (PLA), high impact polystyrene (HIPS), polyethylene glycol (PEG), polyvinyl pyrrolidone (PVP), poly(vinyl methyl ether), poly-vinyl-pyrrolidone, carboxy-vinyl polymers, poly methacrylic acid, polyacrylic acid (PAA), poly (n-isopropylacrylamide) (PNIPAm), polyacrylamides (PAAmm), N-(2-hydroxypropyl) methacrylamid (HPMA), divinyl ether-maleic anhydride (DIVEMA), polyoxazoline, polyphosphates, polyphsphazenes, cellulose, cellulose ether, pectin, polyether; and copolymers or blends containing one or more of these components.

FIG. 3, with reference to FIGS. 1 and 2, is a schematic diagram illustrating that the thermoplastic support shell may comprise a multi-component structure 40. It is challenging to identify suitable materials for the thermoplastic support shell that have a sufficiently high $T_g$ so they will remain geometrically stable during annealing, but can also be easily dissolved using the selective solvent 35. To overcome these challenges, the thermoplastic support shell may comprise a multi-component structure 40 containing two or more component phases. The multi-component structure 40 may comprise two or more discrete thermoplastic components $45_a$ . . . $45_x$; i.e., component phases. In an example, one of the component phases may be a first water-soluble polymer $45_a$, and the other component phase may be a third high $T_g$ polymer $45_b$. Combining these two materials into the thermoplastic support polymer 40 may provide a shell that has high temperature resistance and is also removable with water post-processing.

FIG. 4A, with reference to FIGS. 1 through 3, is a schematic diagram illustrating that the geometry of the multi-component thermoplastic support polymer 40 at least partially surrounds and supports the core 21. In an example, the multi-component support polymer 40 may be deposited layer-by-layer as part of a multi-component structure 50. FIG. 4B, with reference to FIGS. 1 through 4A, is a schematic diagram illustrating an example multi-component filament structure 951, which provides for a first soluble polymer $45_a$ combined with a third high $T_g$ polymer $45_b$. The multi-component filament can be deposited via 3D printing (37) to create a multi-component shell 952, which gives the overall part dimensional stability during annealing (36). The preform structure 950 is thermally drawn (38) to create a monofilament fused filament fabrication (FFF) feedstock 50 having a microstructure 951. In non-limiting examples, the preform structure 950 has a 25 mm diameter; the monofilament, FFF feedstock 50 has a 1.8 mm diameter; and the printer extrudate that forms a microstructure 952 has a 0.5 mm diameter.

In the multi-component filament, the first thermoplastic polymer $45_a$ and the third thermoplastic polymer $45_b$ each may comprise a regular geometric arrangement that may comprise a periodic geometric arrangement with a repetitive pattern. In an example, the regular geometric arrangement may comprise an interlocking geometric arrangement. The geometric arrangement may at least partially confine the first thermoplastic polymer $45_a$ so that it is restricted from release from the multi-component filament during drawing, printing, or annealing. In another example, the first thermoplastic polymer $45_a$ and the third thermoplastic polymer $45_b$ each may comprise a regular geometric arrangement such that all the sides of each of the first thermoplastic polymer $45_a$ and the third thermoplastic polymer $45_b$ are equal and all the inside angles are equal. Moreover, the first thermoplastic polymer $45_a$ may be configured so that the multi-component support polymer 40 can be removed from the polymer core 21 by exposure to the selective solvent 35.

FIGS. 5 through 9B, with reference to FIGS. 1 through 4B, illustrate another embodiment herein. FIGS. 5, 8A, and 8B are block diagrams illustrating a system 55 and FIGS. 6, 7, 9A, and 9B are flow diagrams illustrating a method 100 for creating a high strength thermoplastic structure 65, the system 55 and method 100 comprise providing (105) a first thermoplastic polymer 15; providing (110) a second thermoplastic polymer 20; forming (115) a three-dimensional (3D) solid 60 from the first thermoplastic polymer 15 and the second thermoplastic polymer 20, wherein the 3D solid 60 comprises a continuous solid structure comprising a core 21 formed from the second thermoplastic polymer 20, wherein the first thermoplastic polymer 15 forms an external supporting shell structure 30 that at least partially envelops the polymer core 21, and wherein a first flow temperature $T_{g,shell}$ ($T_1$) of the first thermoplastic polymer 15 is at least 10° C. higher than a second flow temperature $T_{g,core}$ ($T_2$) of the second thermoplastic polymer 20; and annealing (120) the 3D solid 60 at a temperature $T_{anneal}$ ($T_3$) below the first flow temperature $T_g$,shell ($T_1$) and above the second flow temperature $T_{g,core}$ ($T_2$). The 3D solid 60 may be formed by a 3D printing process using a 3D printer 70 with robotic dual heads. As shown in FIG. 7, the method 100 may comprise exposing (125) the first thermoplastic polymer 15 to a solvent 35; and selectively removing (130) the first thermoplastic polymer 15 from the 3D solid 60 without affecting the second thermoplastic polymer 20. In an example, the first thermoplastic polymer 15 may be formed by a fused filament fabrication process.

Figure 8A:
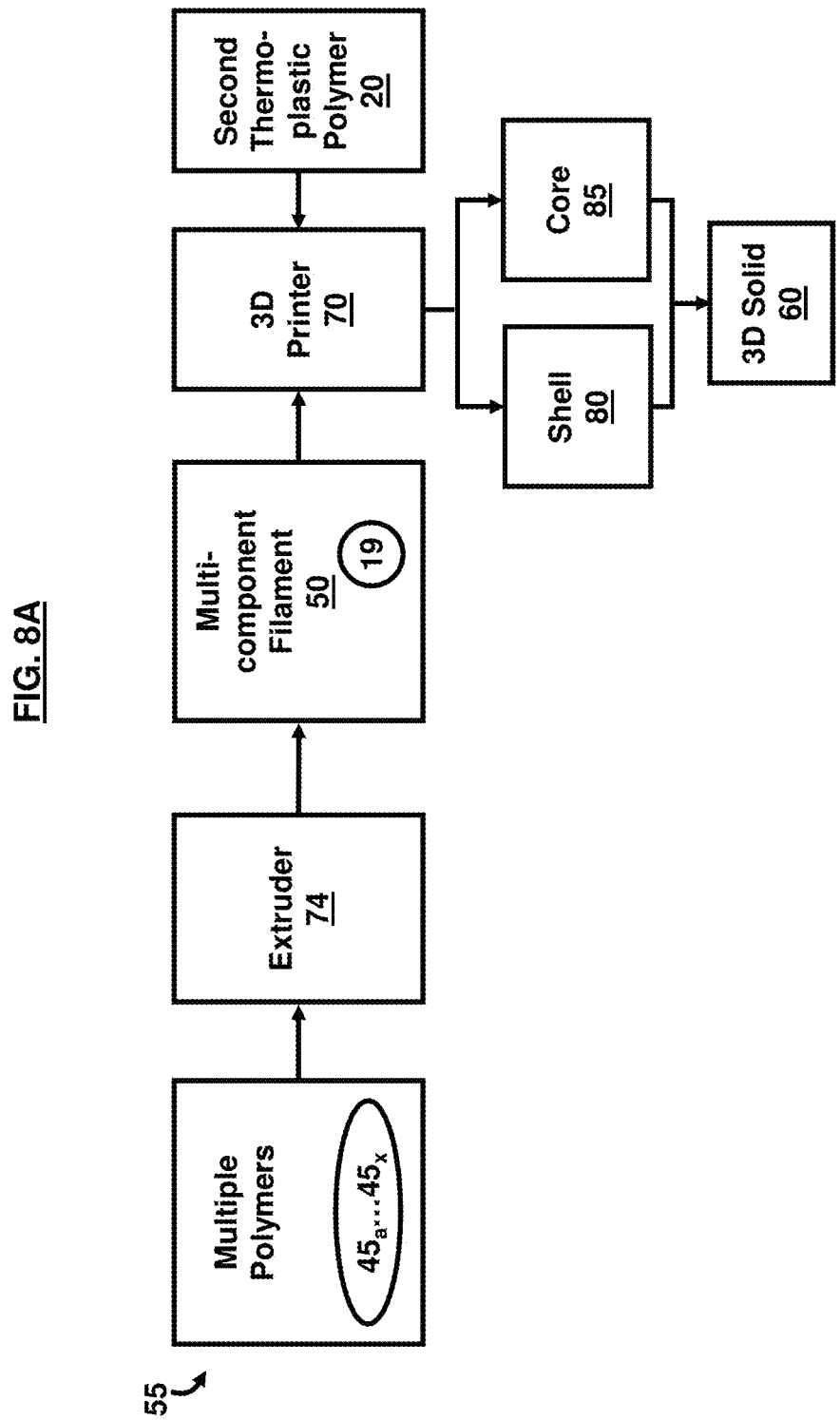
FIG. 8A is a block diagram illustrating a system for creating a shell and core of a 3D solid by forming multi-component filament via extrusion, according to an embodiment herein.
Figure 9A:
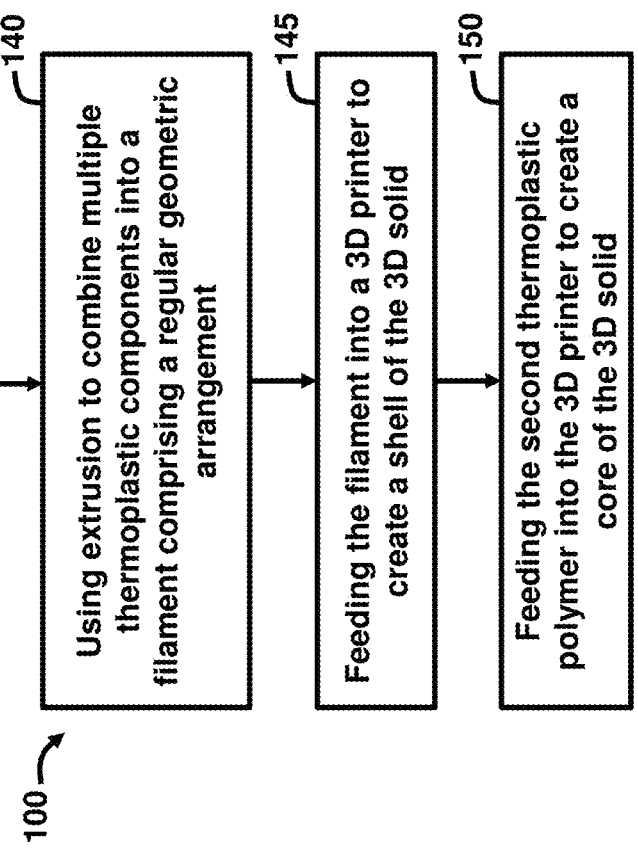
FIG. 9A is a flow diagram illustrating a method of creating a shell and core of a 3D solid by forming multi-component filament via extrusion, according to an embodiment herein.

As shown in FIGS. 8A and 9A, the system 55 and method 100 may comprise using an extrusion process (140) to combine multiple thermoplastic components $45_a \ldots 45_x$ into a filament 50 comprising a regular geometric arrangement 19, such as via a multi-material extrusion process; feeding (145) the filament 50 into a 3D printer 70 to create a shell 80 of the 3D solid 60; and feeding (150) the second thermoplastic polymer 20 into the 3D printer 70 to create a core 85 of the 3D solid 60.

Figure 8B:
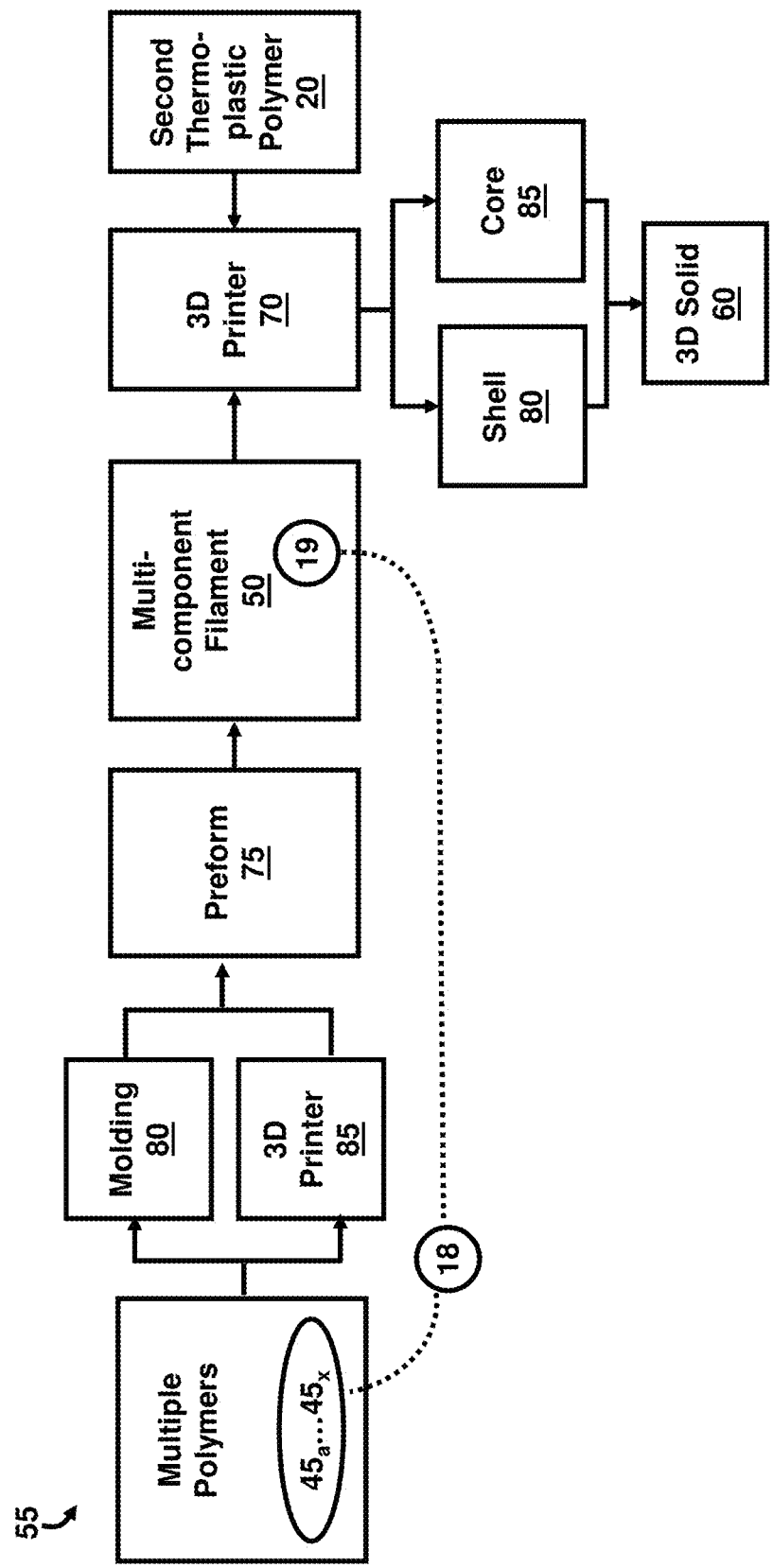
FIG. 8B is a block diagram illustrating a system for creating a shell and core of a 3D solid by forming multi-component filament via creation of a multi-component preform, and then thermal drawing that preform into filament, according to an embodiment herein.

As shown in FIGS. 8B and 9B, the system 55 and method 100 may comprise forming (155) a preform 75 from multiple thermoplastic components $45_a \ldots 45_x$ in a first regular geometric arrangement 18, using for example either molding processes or 3D printing; converting (160) the preform 75 into a filament 50 comprising a second regular geometric arrangement 19 that corresponds to the first regular geometric arrangement 18; feeding (165) the filament 50 into a 3D printer 70 to create a shell 80 of the 3D solid 60; and feeding (170) the second thermoplastic polymer 20 into the 3D printer 70 to create a core 85 of the 3D solid 60.

Figure 10:
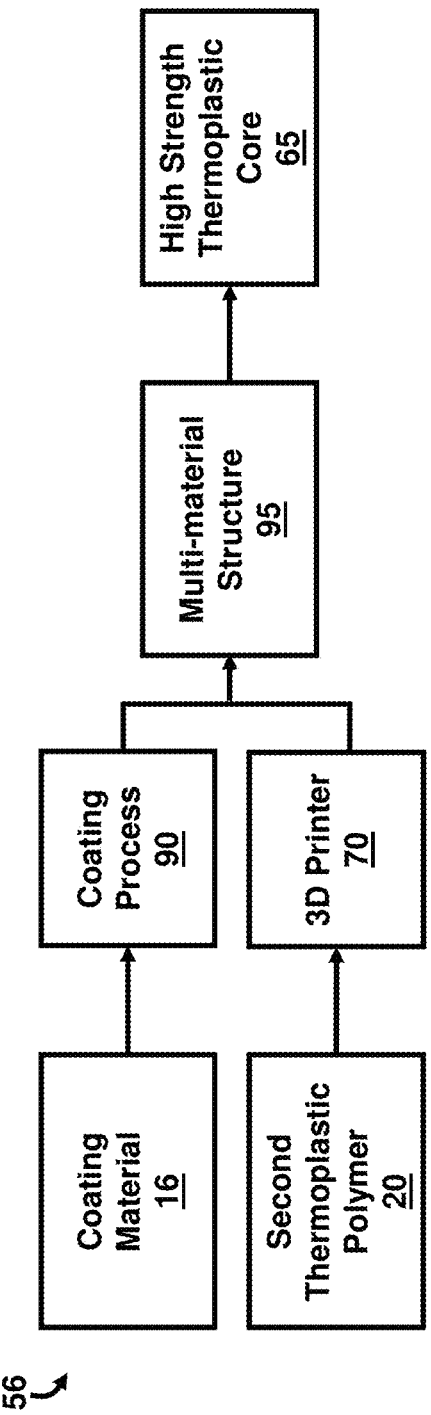
FIG. 10 is a block diagram illustrating a system for creating a high strength thermoplastic structure using a coating material, according to an embodiment herein.

FIGS. 10 and 11, with reference to FIGS. 1 through 9, illustrates another embodiment herein. FIG. 10 is a block diagram illustrating a system 56 and FIG. 11 is a flow diagram illustrating a method 200 for creating a high strength thermoplastic structure 65, the system 56 and method 200 comprising three-dimensional (3D) printing (205) a thermoplastic polymer (i.e., the second thermoplastic polymer 20); coating (210) the thermoplastic polymer (i.e., the second thermoplastic polymer 20) with a coating process 90 and coating material 16 to form a multi-material structure 95; annealing (215) the multi-material structure 95; and removing (220) the coating material 90 from the multi-material structure 95 without changing a mechanical integrity of the remaining thermoplastic structure (i.e., the high strength thermoplastic core 65). The coating material 90 forms an integral, geometrically stable coating that can support load during polymer annealing and can be removed with an efficient and scalable process that does not change the mechanical integrity of the resulting thermoplastic structure (i.e., the high strength thermoplastic core 65). The coating material 16 may comprise any of another thermoplastic polymer (i.e., the first thermoplastic polymer 15), a reversible thermosetting polymer such as a vitromer, a gelatin such as from agar, a salt-based material, a starch-based material, a sugar-based material, or water-soluble tooling (e.g., Aquapour®, a plaster-based coating available from Advanced Ceramics Manufacturing, Arizona, USA). The coating process can include suspending, dissolving, or emulsifying the coating material; dipping, painting, spraying, or 3D printing the coating material; and may also include a secondary drying, heating, or irradiation step to solidify the coating. Removing the coating can occur by exposure to heat, solvents, irradiation, or mechanical action, or a combination of these factors. In another embodiment, the coating may be a thermosetting polymer such as a silicone rubber which, after annealing, can be mechanically removed from the core.

FIGS. 12 through 14, with reference to FIGS. 1 through 11, illustrates another embodiment herein. FIG. 12 is a block diagram illustrating a system 57 and FIGS. 13 and 14 are flow diagrams illustrating a method 300 for creating a high strength thermoplastic structure 65, the system 57 and method 300 comprising three-dimensional (3D) printing (305) a thermoplastic polymer (i.e., the second thermoplastic polymer 20); embedding (310) the thermoplastic polymer (i.e., the second thermoplastic polymer 20) into granular particles 97 to form a multi-material structure 95; annealing (315) the thermoplastic structure 95; and removing (320) the granular particles 97 from the thermoplastic structure 95 to create the high strength thermoplastic structure 65. The granular particles 97 may comprise a bed of any of sand 98a, monodisperse glass beads 98b, polydisperse glass beads 98c, metal beads 98d, or may be composed of salt, sugar, ceramic, high temperature polymer, natural materials such as walnut shells or cherry pits, or any other flowable granular material that can support the thermoplastic structure 95 during annealing. The bed of granular particles 97 may provide mechanical support to the thermoplastic structure 95 during annealing.

FIG. 14 illustrates that the method 300 may comprise pressurizing or evacuating (325) the granular particles 97 using any suitable device 99 to stabilize the granular bed. In an example, pressurizing the granular particles 97 may improve the mechanical support to the thermoplastic structure 95. In an example, the device 99 may comprise a vacuum pump. In an example, the pressurizing may occur from atmospheric pressure. For example, one approach for applying atmospheric pressure is to full a pliable air-tight bag, such as a plastic bag, with the granular particles 97, and embed the thermoplastic polymer (i.e., the second thermoplastic polymer 20) into the bed of granular particles 97, then seal the bag and evacuate the air from the bag. This approach results in atmospheric pressure being applied to the bag, which induces contact forces between the granular particles 97, and which increases their resistance to deformation. It may also be helpful to provide a small amount of binder to the granular bed to stabilize the bed during pressurization and annealing.

To demonstrate the validity of the final polymer body 10 having a high toughness and homogenized core, fracture toughness measurements of example structures are presented. Fracture toughness is a preferred measurement, compared to simple strength characterization via, e.g., specimen dogbones, because of the brittle behavior of polymers as-printed via FFF. Brittle materials are highly flaw sensitive, therefore flaw characterization is important when reproducing strength values. Parts of complex geometry are also experimentally printed and annealed without fixturing, to show the dimensional stability of shelled parts. Additionally, an application example is provided that demonstrates a practical geometry with a load requirement that cannot be met as-printed, but which is enabled by annealing a shelled part in accordance with the embodiments herein.

Experiment

The specific parameters, values, amounts, ranges, materials, types, brands, etc. described below are approximates and were merely selected for the experiment, and as such the embodiments herein are not limited to the specific descriptions below. The shelled printing concept provides that the core 85 and shell 80 materials have $T_g$ values separated by a sufficiently wide temperature range ($T_{b,core} \ll T_{g,shell}$), so the printed part can be annealed at a temperature $T_a$ where the core 85 (i.e., the second thermoplastic polymer 20) will flow and reptate ($T_{g,core} < T_a$) while the shell 80 (i.e., the first thermoplastic polymer 15) remains geometrically stable ($T_a < T_{g,shell}$). Amorphous polymers, rather than semi-crystalline polymers, may be selected in order to eliminate complications arising from crystallization kinetics and resulting changes in material properties. ABS and polycarbonate (PC) are both amorphous polymers with glass transition temperatures of approximately 100° C. and 150° C., respectively. M30 ABS and PC-10 polycarbonate filament (available from Stratasys, Inc., Minnesota, USA) may be selected for the core 85 and shell 80 materials. Evaluating interlaminar material properties requires tight control of extrusion rates, which relies on accurate filament diameter. The diameter of the filament spools used to fabricate the samples are measured to ensure acceptable precision (±0.002 mm).

In one embodiment, the shelling process maintains the original part geometry by sacrificing a thin outer layer of the model to comprise the shell 80. Because the shell 80 will not increase appreciably in bond strength during annealing, it should be minimized in thickness, while maintaining sufficient thickness to hold the part geometry during annealing. The shell 80 should be at least one line width thick in order for the 3D printer 70 to resolve the feature; a shell thickness of 1 mm was selected for the experiment to exactly match two 0.5-mm-wide lines. 3D CAD software was used to generate the models for the experiment. The shell model may be produced using the "shell" function and the core model was produced by subtracting the shell model from the original model. Both models were then exported as STL files to be imported into slicing software. An alternate strategy for producing a PC shell 80 would be to use slicer settings to print each layer's perimeter with PC from the secondary printer head. However, this approach can lead to unwanted variations in shell thickness, especially in regions with dramatic changes in layer-to-layer shape.

Figure 15A:
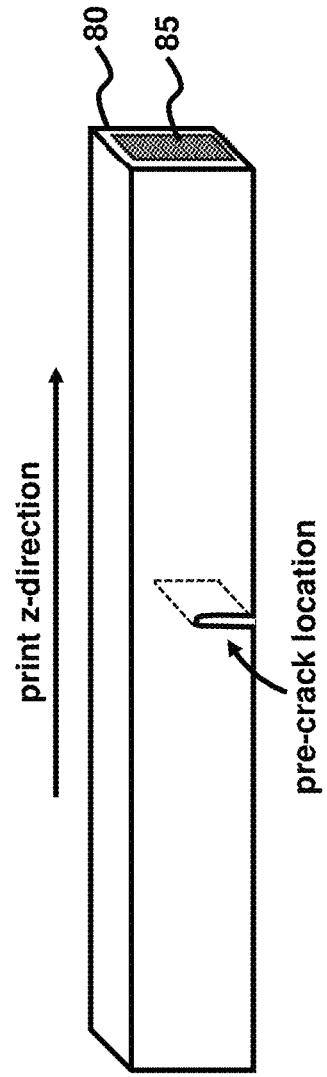
FIG. 15A is a schematic diagram illustrating perspective view of an experimental PC-shelled, ABS core single edge notch bend (SENB) specimen, according to an embodiment herein.
Figure 15C:
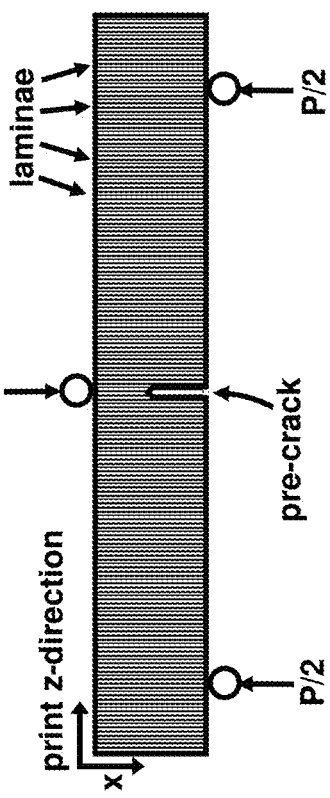
FIG. 15C is a schematic diagram illustrating a front view of the SENB specimen of FIG. 15A, according to an embodiment herein.
Figure 15B:
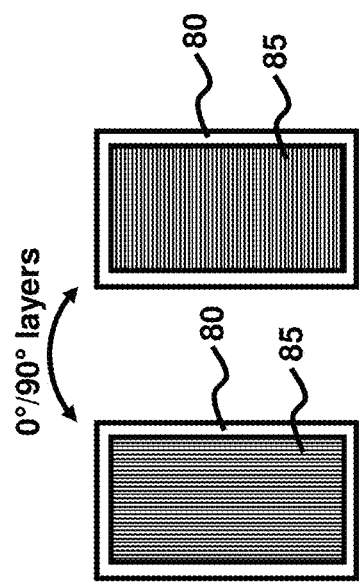
FIG. 15B is a schematic diagram illustrating a side view of the SENB specimen of FIG. 15A at 0° and 90° orientations, according to an embodiment herein.

Experimentally, single edge notch bend (SENB) samples, as shown in FIG. 15A, were sized in accordance with ASTM E1820. The ABS core 85 of each sample was 10×20×100 mm as shown in FIG. 15B. A 1 mm PC shell 80 was added to the original dimensions resulting in a 12×12×102 mm printed part. As shown in FIG. 15C, each SENB sample was printed with its length oriented vertically on the print bed so that crack propagation would be parallel to the printed layers. Custom g-code was added to the slicer output in order to halt the print at 50 mm. During this halt a piece of 0.06 mm Kapton® tape (available from DuPont Electronics, Inc., Delaware, USA) was inserted at the current layer covering half of the surface. When the print was resumed, the Kaptonx tape prevented half of the new layer from adhering to the previous layer. This method forms a pre-crack that is sharper and located more precisely than a pre-crack created by a blade or saw after printing. An extra priming of the printer nozzle takes place after the Kapton® tape was placed to ensure that the flow of material was fully restarted, preventing under-extrusion at the start of the next layer. The tape was left in place during annealing to prevent the pre-crack from healing. The total time elapsed between pause and resumption of printing for tape placement was kept consistently at 20 seconds.

The PC shell 80 on the SENB samples were removed after printing with a 12.7 mm diameter endmill on a miniature milling machine. Removing the PC shell 80 differs slightly from the general shell-print concept, where the shell 80 remains integral for the lifetime of the part. This change was implemented for the mechanical characterization experiments to isolate the effects of annealing on the ABS core 85, without the additional mechanical influence of the PC shell 80. Additionally, a 1 mm long fluted region of approximately 2 mm in width at the base of the pre-crack region was created in each sample using a #51 endmill to aid in the initiation of crack propagation. This fluted region ensured separation between pre-crack faces, by removing any material that may have flowed around the inserted Kapton® tape during annealing.

Figure 16:
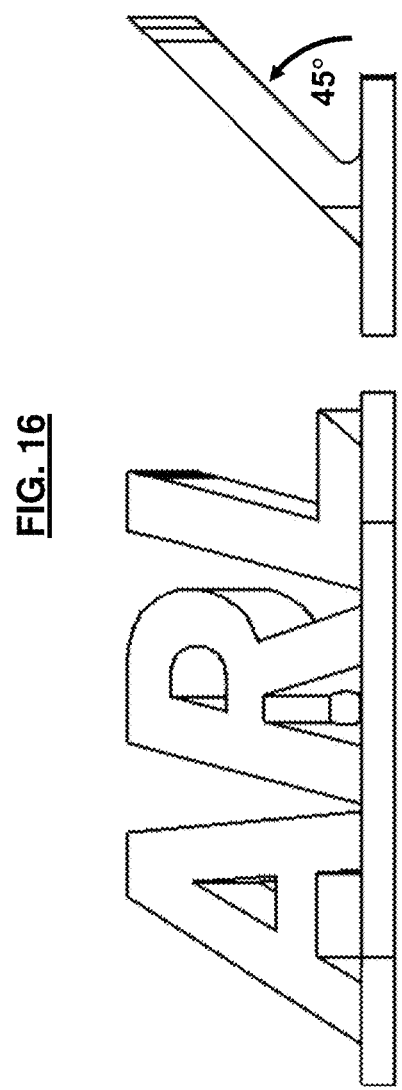
FIG. 16 is a schematic diagram illustrating an experimental creep sample, according to an embodiment herein.

Additional creep samples, as shown in FIG. 16, were designed so that their geometric stability during the annealing process could be qualitatively evaluated. These creep samples contained an 80×40×5 mm chamfered base with a cantilevered section extruded from the base at a 45° angle relative to horizontal. This angle allowed the part to print easily, but created a sufficiently large cantilever to induce deformation under its own weight if the material was sufficiently softened during post-processing. The height and depth of the cantilever were 30 mm measured from the base. Two specimens were fabricated: one composed of ABS only, and a second printed as PC-shelled ABS. For the shelled specimen, a 1 mm shell was created by subtracting 1 mm from all of the model's edges so that the resulting ABS and PC-shelled ABS samples had identical overall geometry.

Figure 17C:
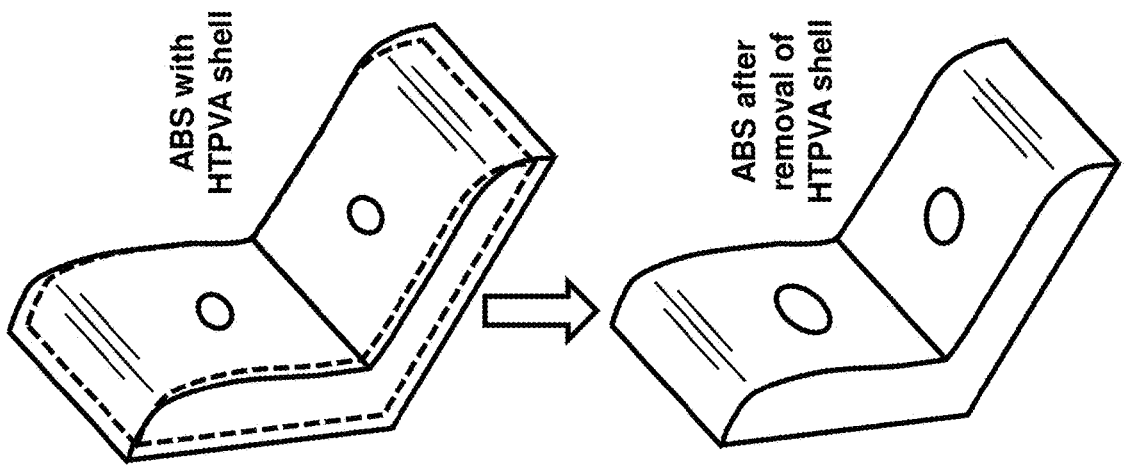
FIG. 17C is a schematic diagram illustrating a 3D printed ABS L-bracket with a removable PVA shell, according to an embodiment herein.
Figure 17B:
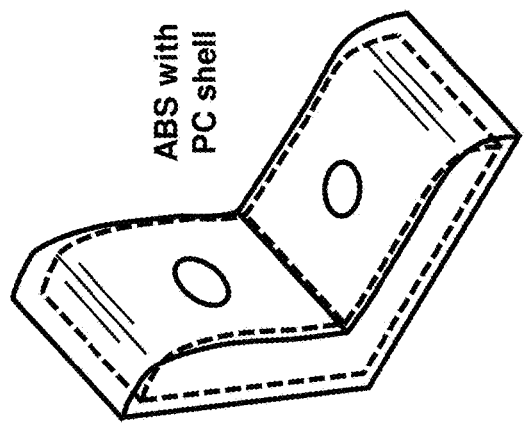
FIG. 17B is a schematic diagram illustrating a 3D printed ABS L-bracket with an integral PC shell, according to an embodiment herein.
Figure 17A:
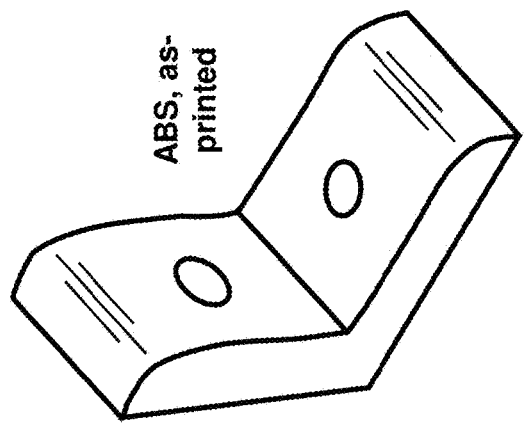
FIG. 17A is a schematic diagram illustrating a 3D printed ABS L-bracket.

Another experimental sample was designed in the shape of an L-bracket, as shown in FIGS. 17A through 17C, containing of two 50×10×33 mm arms at a 90° angle. Each face had a 5 mm diameter bolt hole offset 20 mm from the edge of the part. The ends of the bracket were filleted. The print orientation was such that one of the arms was parallel to the bed and the other arm was perpendicular to the bed. Eleven specimens were initially fabricated: five composed of ABS only (FIG. 17A), and six printed as PC-shelled ABS (FIG. 17B). For the shelled specimens, a 1 mm shell was created by subtracting 1 mm from all of the model's edges so that the resulting ABS and PC-shelled ABS samples had identical overall geometries.

Samples for all tests were prepared on a LulzBot® TAZ 6 desktop printer (available from Aleph Objects, Inc., Colorado, USA) and sliced in Simplify3D® 3.0.2 software (available from Simplify3D LLC, Ohio, USA) with the same parameters. Layers were 0.22 mm thick and line width was 0.58 mm for the core and 0.5 mm for the perimeter using a 0.50 mm brass LulzBot® nozzle. ABS was printed at 240° C. and PC was printed at 290° C. The bed was heated to 110° C. for ABS samples and 130° C. for PC-shelled ABS samples. Samples were printed with two perimeter shells (PC), two top and bottom layers (PC) and 100% infill (ABS). A rectilinear infill was used with rasters perpendicular to the perimeter for SENB samples and fixtures. Perimeters were printed at a maximum of 30 mm/s and other raster types were printed at 50 mm/s. Layers that would print in under 20 s were proportionally slowed to ensure a minimum of 20 s for cooling between layers. Fan speeds were set to 100% with ambient temperatures ranging from 15 to 20° C. without an enclosure. The factory LulzBot® TAZ 6 bed with a borosilicate glass bed covered with a Kapton® sheet was used with an additional layer of Kapton® tape and adhesive (e.g., Cube Glue, available from 3D Systems, Inc., South Carolina, USA). Any settings not mentioned were deemed to not impact print quality and were kept at the default settings for the respective devices and/or software.

In order to effectively anneal PC-shelled ABS samples, an annealing temperature should be selected between the $T_g$ of ABS and the $T_g$ of PC. The $T_g$ of Stratasys® ABS M30 is 105° C. and the $T_g$ of Stratasys® PC-10 is 147° C. Because the annealing times required to fully heal the interfaces decreases as the temperature increases, it is desired to use higher annealing temperature while not significantly softening the PC phase. For the experiments, an annealing temperature of 135° C. was selected.

ABS is expected to develop a high strength bond after 72 hours of annealing at 135° C. However, for the experiments, samples were annealed for 168 hours (1 week) to be confident that the ABS had fully annealed. Full annealing exposures were performed on the following PC-shelled samples: five SENB samples, one creep sample, and six L-bracket samples. One unshelled ABS creep sample was annealed for only 2 hours, long enough for it to exhibit dramatic geometric deformation. All samples were annealed in a Heratherm® oven (available from Thermo Electron LED GmbH, Langenselbold, Germany), inserted after the oven was pre-heated, and air cooled under ambient conditions after annealing. Each annealed PC-shelled ABS sample was measured along its length, width, and height before and after annealing to monitor for geometric deformation. Table 1 summarizes the samples fabricated, and their annealing and testing conditions.

Inter-laminar fracture toughness testing was used to evaluate the mechanical performance of annealed specimens. This particular test provides a metric of healing in the region between printed layers where FFF parts tend to be the weakest, and where failure typically initiates during other modes of loading such as tension, compression, or flexure. Fracture toughness was evaluated by calculating the critical elastic-plastic strain energy release rate ($J_{IC}$) using the well-known compliance check fracture testing method. This approach can be used to characterize both brittle and ductile materials. Specimens were cyclically loaded with displacement control of 0.5 mm/min between a progressively increasing minimum ($\delta_l$) and maximum ($\delta_u$) displacement. $\delta_l$ started at 0.1 mm and incremented by 0.1 mm for each loading cycle, while $\delta_u$ started at 0.25 mm and incremented by 0.2 mm for each loading cycle. The test was continued for 15 cycles unless automatically stopped after complete failure or manually stopped after a crack propagation distance of 6 mm, to avoid edge effects caused by the plastic zone interacting with a specimen boundary. Tests were performed on a load frame, such as an Instron® testing system (available from Illinois Tool Works Inc., Illinois, USA) with a 2200 N load cell and 6.35 mm diameter pins with a span of 80 mm (as indicated in FIG. 15C). Crack propagation was optically imaged using a grayscale Point Grey® camera (available from FLIR Systems, Inc., Oregon, USA). Crack propagation was measured manually, post-testing, using ImageJ processing tools available from the National Institutes of Health and the Laboratory for Optical and Computational Instrumentation.

Figure 18B:
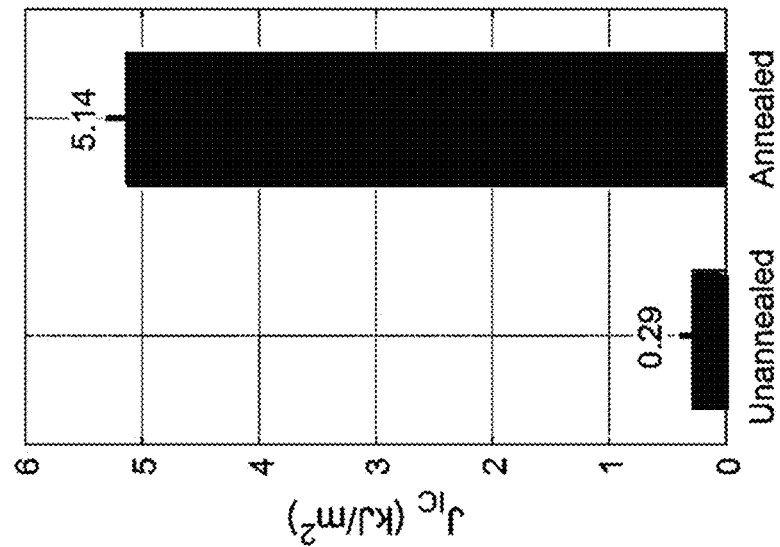
FIG. 18B is a graph illustrating results of SENB fracture testing showing a comparison of unannealed and annealed $J_{IC}$ values, with standard deviations indicated by vertical lines, according to an embodiment herein.
Figure 18A:
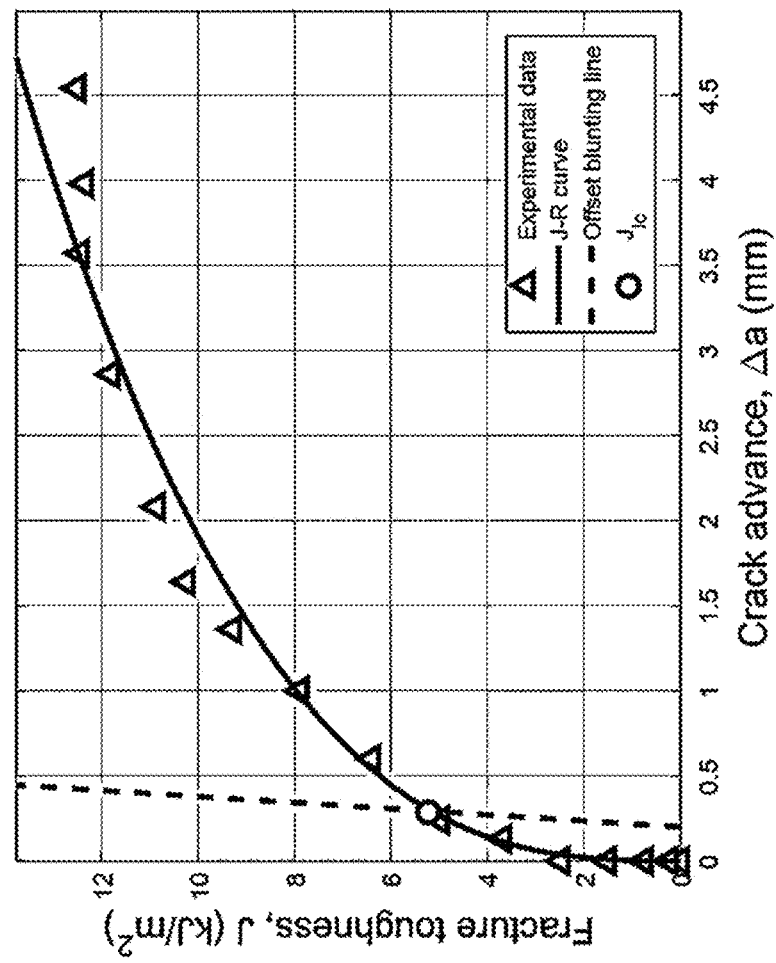
FIG. 18A is a graph illustrating results of SENB fracture testing showing a representative J-R curve produced from analysis of a shelled annealed SENB sample with $J_{IC}$ equal to 5.45 kJ/m$^2$, according to an embodiment herein.

The peak force of each load-displacement cycle was correlated with the corresponding image to measure the crack advance at that point in time. Following ASTM E1820, the sample geometry, load, and crack displacement are used to calculate total strain energy release rate J at each loading increment as the sum of the elastic and plastic contributions ($J=J_p+J_e$). For a material undergoing brittle fracture, only elastic energy contributes to crack propagation, and the fracture toughness value was calculated based on load and crack displacement conditions at the moment of catastrophic failure. For a specimen undergoing ductile failure, as shown in FIG. 18A, the J-R curve power fit represents the critical elastic-plastic strain energy release rate $J_{IC}$. Section 9.2 of ASTM E1820 was referenced to determine if crack propagation was brittle (unstable) or ductile (stable).

Mechanical testing of the printed L-brackets was performed by bolting one face to a flat back plate and securing the other face to a tensile fixture with a pin and chain, which is subsequently loaded in tension. This loading generates an opening bending moment at the corner of the bracket. The expected failure mode is mixed Mode I and Mode II fracture at the plane where the two faces meet, due to a combination of shear and bending. Mechanical tests were performed on the Instron® model 1122 load frame with a 2200 N load cell, loaded at a rate of 1 mm/min and started with a 100 N pre-load to ensure there was no slack in the chain or fixtures. Testing was continued to failure. Five annealed PC-shelled ABS and five unannealed ABS brackets were tested. Additionally, an annealed PC-shelled L-bracket was used to suspend a 778 N researcher and 23 N of chain and hardware from a horizontal beam.

Fracture surfaces of the SENB samples and the L-bracket samples were imaged using a digital microscope, such as a Keyence® VHX-2000 (available from Keyence Corporation, Osaka, Japan) under 30× optical zoom. For some test

TABLE 1

Test Samples Fabricated for Property Evaluation

| Sample type | Construction | Annealing condition | Evaluation metric | # Samples |
|---|---|---|---|---|
| SENB | PC shell/ABS core | No anneal | Fracture toughness, $J_{IC}$ | 5 |
|  | PC shell/ABS core | 168 h at 135° C. |  | 5 |
| Creep | ABS only | 2 h at 135° C. | Geometric stability | 1 |
|  | PC shell/ABS core | 168 h at 135° C. |  | 1 |
| L-bracket | ABS only | No anneal | Failure strength | 5 |
|  | PC shell/ABS core | 168 h at 135° C. |  | 5 |
| L-bracket | PC shell/ABS core | 168 h at 135° C. | Static load demonstration | 1 | specimens, testing ended before the crack propagated completely through the sample. To examine these fracture surfaces after testing, the samples were submerged in liquid nitrogen for a minimum of 60 seconds and then removed, clamped to a vice, and struck with a mallet in a manner consistent with dynamic mode I opening of the crack. The mallet strike caused the existing crack to travel completely through the part, creating two halves and two corresponding fracture surfaces for optical imaging.

Figure 19A:
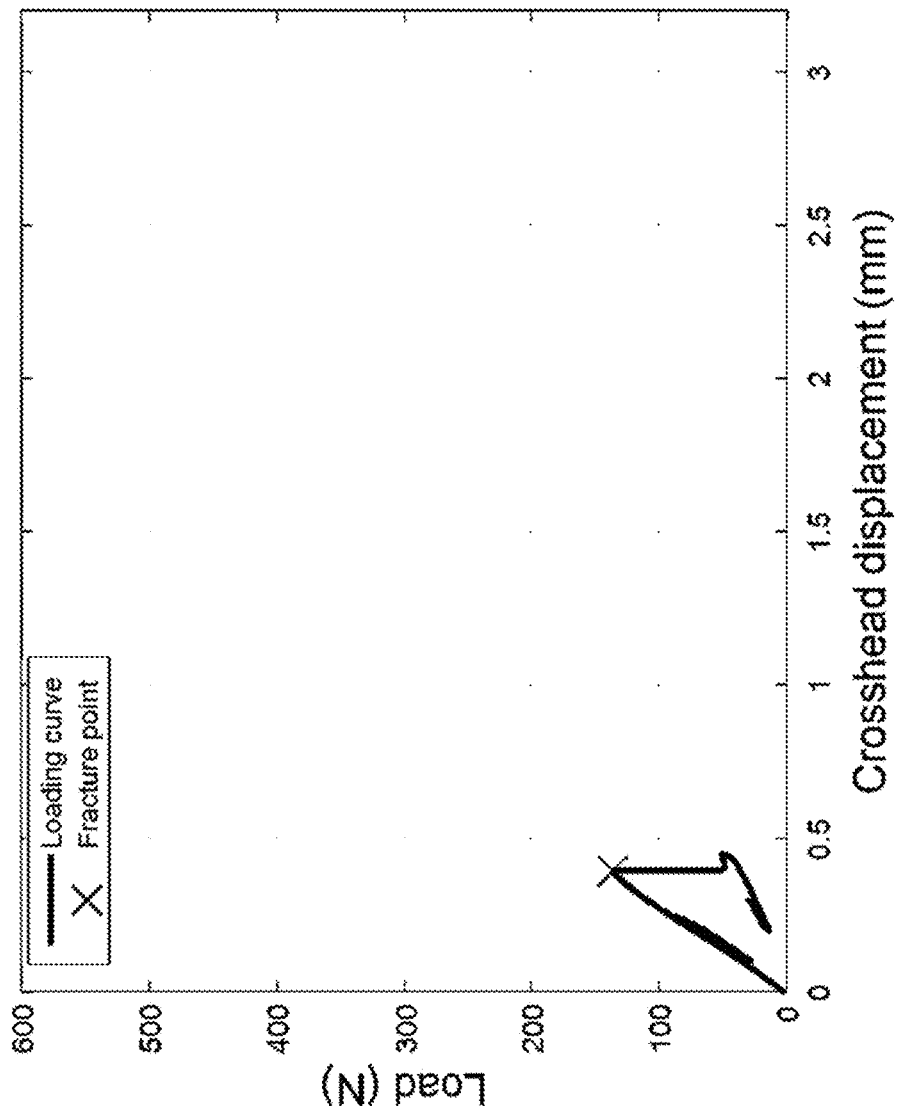
FIG. 19A is a graph illustrating a representative load-displacement curve for SENB samples exhibiting an unstable brittle failure in an unannealed sample.
Figure 19B:
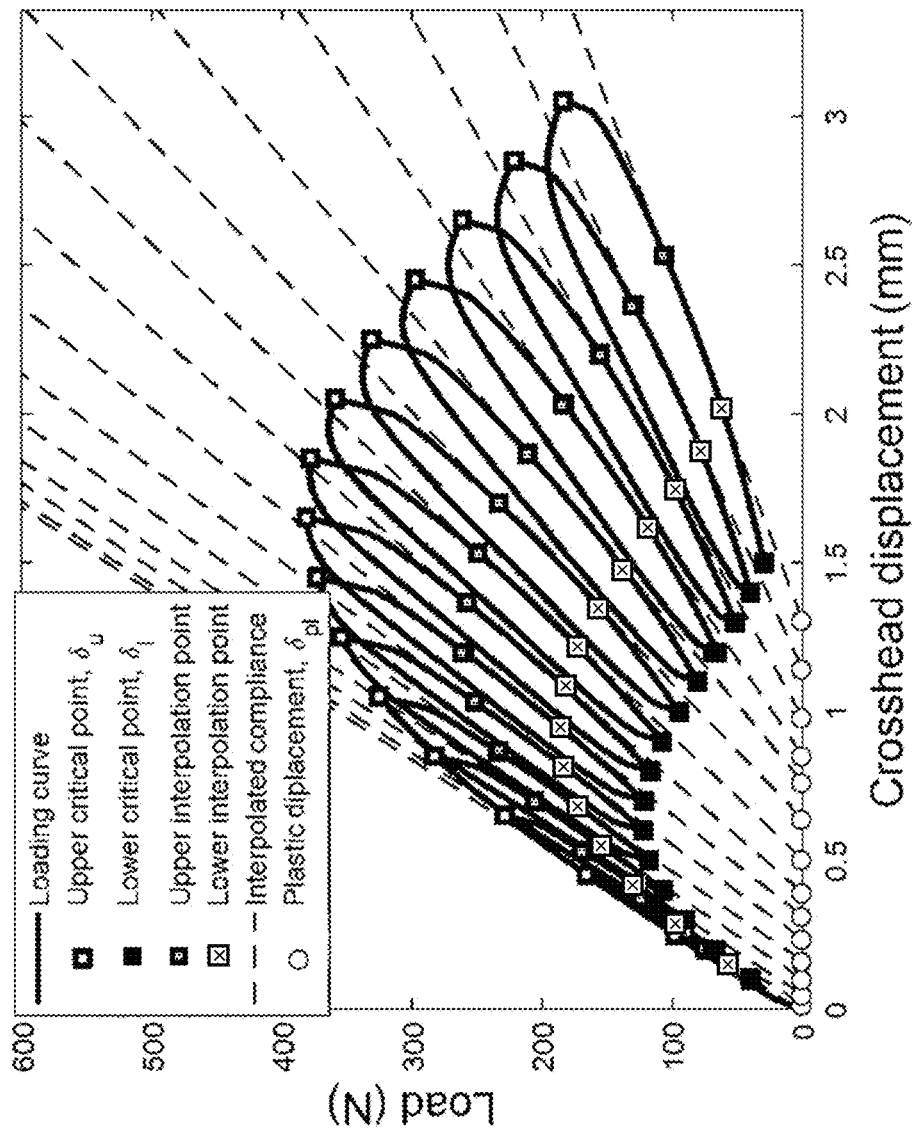
FIG. 19B is a graph illustrating a representative load-displacement curve for SENB samples exhibiting ductile stable crack propagation in an annealed sample, according to an embodiment herein.

FIG. 19A shows the load-displacement curve of a representative unannealed and annealed PC-shelled ABS samples, after removal of the PC shell. All unannealed specimens failed in an unstable brittle manner, with the crack propagating rapidly through the interface between print layers, resulting in a rapid drop in load during the early, linear-elastic portion of the loading curve, as shown in FIG. 19A. The average $J_{IC}$ value over all five unannealed specimens was $0.285\pm0.09$ kJ/m$^2$ ($c_v$=31%). This value is very similar to the value of fracture toughness, 0.260 kJ/m$^2$, reported in the industry for unannealed ABS printed without a PC shell. All unannealed specimens failed before the displacement cycles were complete. In contrast, the load-displacement curve of the annealed sample, as shown in FIG. 19B, shows a softening response indicative of plastic deformation and stable, ductile failure. Whitening in these specimens in the vicinity of the crack tip during testing, as shown in FIG. 19C, is consistent with the formation of a plastic zone. None of the annealed samples underwent crack propagation through the entire sample and the displacement cycles were completed each time. The crack propagation exceeded 6 mm for one sample and measurements for that sample were not taken beyond 6 mm of crack propagation to avoid edge effects. FIG. 18A shows the J-R curve for the annealed sample data from FIG. 19B. The average $J_{IC}$ for the annealed specimens was $5.14\pm0.1$ kJ/m$^2$=2%), an 18-fold increase over the average $J_{IC}$ of the unannealed specimens as shown in FIG. 18B. This value is lower than the fracture toughness of 6.94 kJ/m$^2$ reported in the industry for unshelled ABS annealed under identical time-temperature conditions within a confining metal mold, although both results similarly show fully ductile crack propagation and extensive plastic deformation.

Figure 20B:
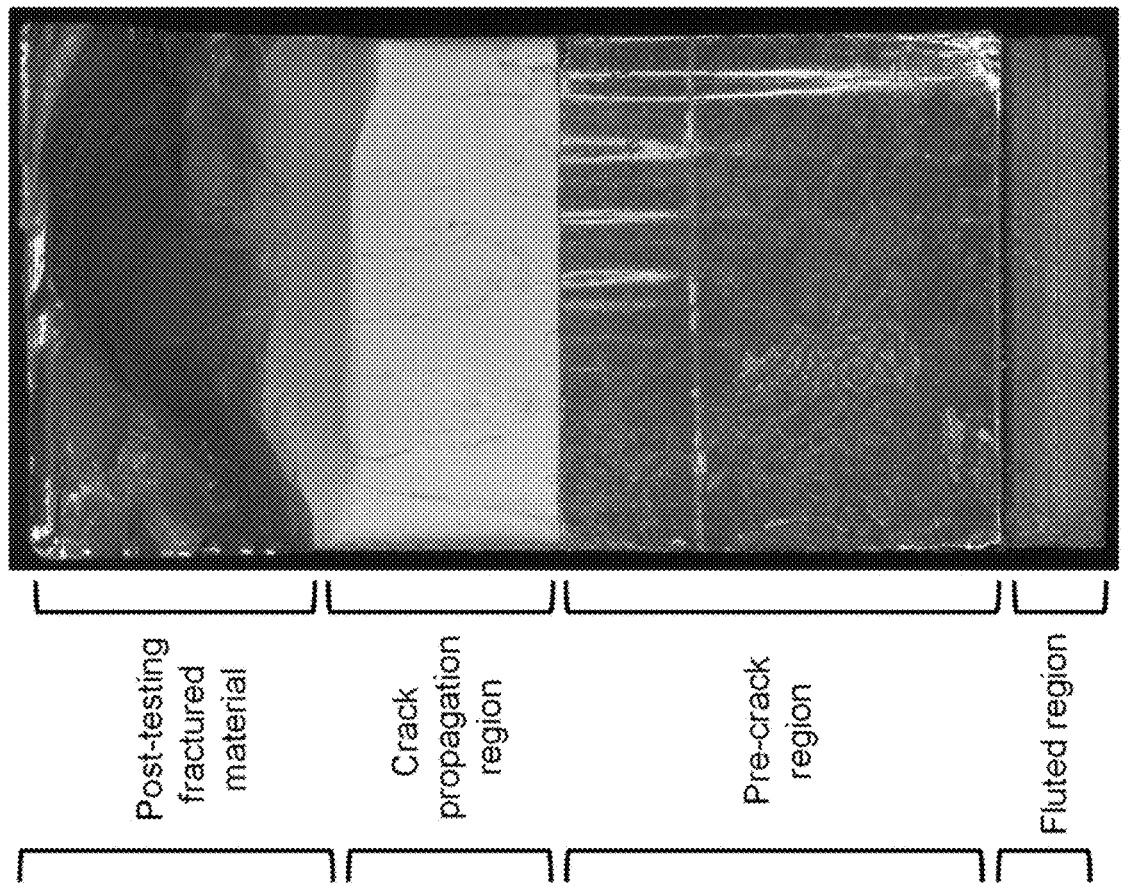
FIG. 20B is a magnified optical image of fracture surfaces of SENB specimens showing an annealed SENB sample exhibiting ductile failure, according to an embodiment herein.
Figure 20A:
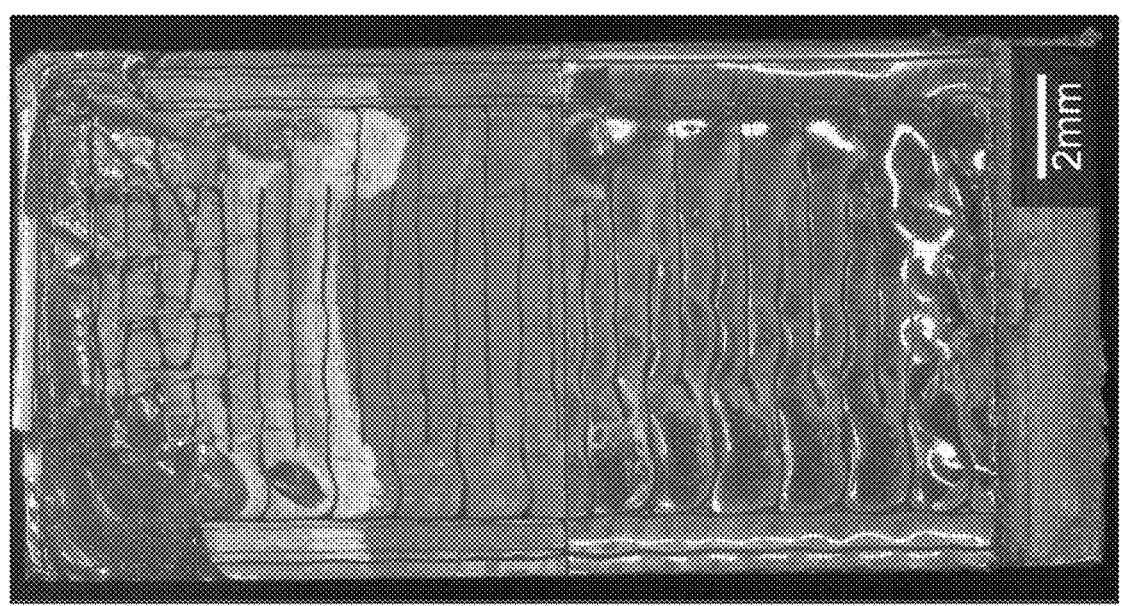
FIG. 20A is a magnified optical image of fracture surfaces of SENB specimens showing an unannealed SENB sample exhibiting brittle failure.

FIGS. 20A and 20B show representative fracture surfaces of unannealed and annealed specimens. The crack propagation region shows where the crack advanced during fracture testing, and the post-testing fractured material region indicates where unstable crack growth occurred (for brittle samples) or where freeze-fracturing was induced (for ductile samples). The printed raster pattern is visible throughout the entire unannealed ABS fracture surface, with the relatively smooth fracture faces on each raster reflective of the brittle, low energy failure of this interface, as shown in FIG. 20A. In contrast, for the annealed specimen, individual rasters have been healed and are no longer visible. Additionally, mechanisms of plasticity are visible in the form of crack surface whitening (crazing) and path tortuosity, as shown in FIG. 20B.

Measurements of SENB sample dimensions before and after annealing indicate small dimensional changes. The samples were annealed on their side such that gravity was compressing samples along their y-axis. They-dimension shrunk in every sample by less than 1%. The x- and z-dimensions increased in every sample by less than 2%, resulting in an average volumetric reduction of 0.6%. The largest volumetric reduction between the five samples was 1.3%. The volumetric reduction was not associated with a reduction in mass.

The unshelled and shelled cantilevered creep samples, shown in FIGS. 21A and 21B, behaved differently during isothermal annealing. After only 2 hours of isothermal annealing at 135° C., the unshelled ABS sample dramatically slumped under its own weight. Qualitatively, the slumping accounts for most of the geometric deformation although some deformation from the relaxation of internal stresses caused by the print process may have also occurred. In contrast, the PC-shelled sample did not visibly deform after 168 h of annealing. The distance measured from the base of the cantilever structure to the top of the cantilever structure measured vertically and along the diagonal did not significantly change (<1%). Moreover, the mass of each of the samples remained unchanged by the annealing process.

Figure 22:
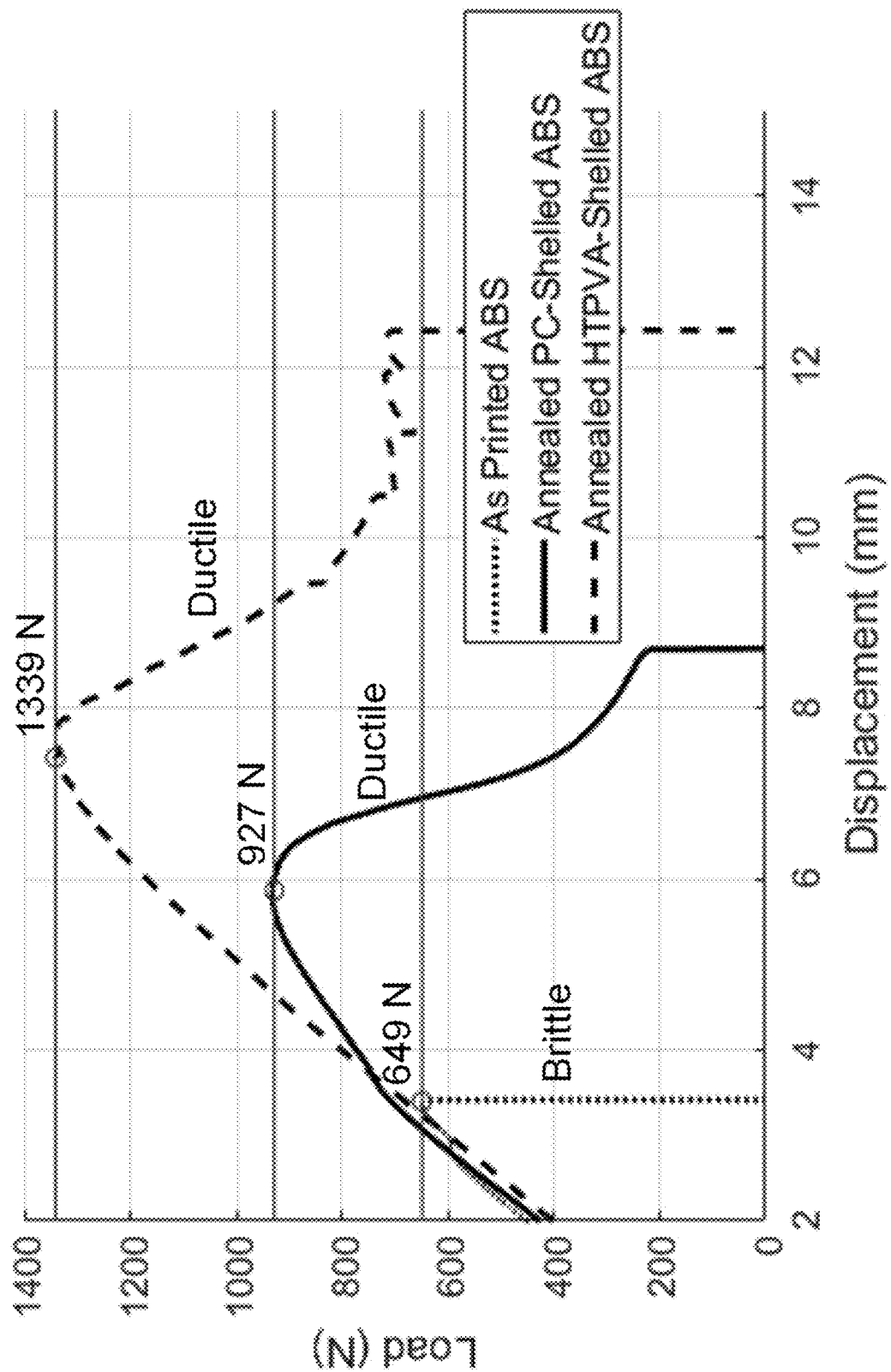
FIG. 22 is a graph illustrating load-displacement curves during tensile frame testing of an unannealed ABS L-bracket; an annealed, PC-shelled L-bracket; and an annealed HTPVA-shelled L-bracket after shell removal, according to the embodiments herein.

FIG. 22 shows representative load-displacement curves during tensile testing of the L-brackets. The unannealed ABS brackets all exhibited brittle failure at an average load of $485\pm89$ N. Like the SENB samples, these parts failed in an unstable brittle manner creating a flat fracture plane with evident print raster lines. In contrast, the annealed PC-shelled L-brackets reached an average load of $924\pm57$ N, with evident strain softening during loading and graceful, ductile failure after peak load was reached. This 90% increase in ultimate load was accompanied by a decrease in standard deviation. The fracture plane for these specimens spanned over multiple print layers. Like the SENB samples, the ABS core of the shelled samples had a white appearance indicative of ductile plastic deformation. The higher load capacity of an annealed PC-shelled ABS bracket allowed it to suspend a researcher on a seat suspended by a chain, with a total load of 827 N. Based on the tensile fixture data, it is expected that an unannealed ABS L-bracket would fail if similarly loaded by body weight.

The fracture toughness measurements confirm that annealing leads to a drastic increase in fracture toughness and a transition from brittle failure to ductile failure, consistent with industry standards on annealing of FFF ABS parts. The fracture toughness of the annealed, shelled parts reached values more than 1800% higher than unannealed specimens. Moreover, the annealed specimens exhibit consistent ductile failure and plastic deformation, unlike conventional as-printed, unannealed parts, which exhibit brittle inter-laminar fracture. The combination of these results with the creep results confirms the applicability of the embodiments herein, whereby a thin PC shell around an ABS part transforms the brittle as-printed FFF part into a ductile, tough part while maintaining the as-printed part geometry. The parts in the experiment described above used a minimal shell thickness of two line widths. For larger parts, and longer cantilevers generating higher bending moments, a thicker shell could be utilized. Moreover, numerical optimization constrained by simulations of part sag during thermal annealing could be used to design parts with optimal shell thickness distributions to achieve desired part tolerances. As parts get smaller, the ratio of shell material to core material will increase and eventually the volumetric proportion of core relative to shell will come too small to generate significant gains from annealing. For these situations, it may be helpful to utilize a specialized printer head for printing extremely thin rasters. Alternatively, one could print a shell out of a scavengible polymer so that the shell would not be limited in thickness, and could be removed after annealing. In such a process, the material of the core 85 should be chemically resistant to the solvent 35 used for removing the shell 80, and the shell should still have a significantly higher flow temperature than the core 85.

As an example, similar L-bracket parts were printed using a high temperature PVA (HTPVA) thermoplastic as the shell material, printed using Prima Select (Malmoe, Sweden) PVA HT (natural color) filament (FIG. 17C). In anticipation of shell removal, the ABS core was sized at the final desired bracket size of 50×10×33 mm per arm, with an additional 1.5-mm-thick shell of HTPVA surrounding the ABS core. These parts were annealed at 135° C. for 168 h. After annealing, the parts were submerged in a water sonication bath at 50° C. for 2 hrs, which resulted in the HTPVA shell sloughing off of the ABS core. The remaining annealed, ABS L-brackets were then mechanically tested, resulting in an ultimate load of 1288±76 N over three test specimens. FIG. 22 compares the load displacement curve for representative L-brackets from as-printed, annealed in a captive PC shell, and annealed with a removable HTPVA shell. The removable shell approach allows for the entire L-bracket part volume to be annealed, resulting in the highest mechanical performance. The higher load capacity of an annealed removable HTPVA shell ABS bracket allowed it to suspend a researcher on a seat suspended by a chain, while holding a 45 lbm weight, with a total load of 1027 N. Based on the tensile fixture data, it is expected that both the unannealed and annealed, PC-shelled ABS L-brackets would fail if similarly loaded by body weight.

The techniques provided by the embodiments herein deposit a shell 80 of high-$T_g$ material around a core 85 of low-$T_g$ material. It is possible that mechanical support during annealing could also be enhanced by including reinforcing traces of high-$T_g$ material within the core 85, akin to building an open 3D truss filled with annealable low-$T_g$ polymer. In another example, stability may also be achieved during annealing by combining two different $T_g$ materials deterministically into a single filament. According to another example, the shell concept may be extended to include depositing a third, outer shell material configured to soften and flow during annealing to achieve a high gloss surface finish.

The descriptions above regarding the pairing of the ABS and PC materials represents an example in which the embodiments herein may be implemented. Many other pairings of amorphous, and even semi-crystalline polymers, could be implemented, provided there is a suitable annealing temperature that encourages rapid reptation of the core polymer while the shell polymer remains mechanically stiff and elastic. If semi-crystalline polymers are to be used, then changes in the mechanical performance and residual stresses should be accounted for as a function of material crystallinity induced from the annealing processes.

In another example, the annealing times may be reduced. As indicated above, annealing ABS for 72 h at 135° C. would be sufficient to anneal the ABS core to a high strength. However, switching to a higher temperature shell material, such as polyetherimide (PEI, $T_g$≈200° C.), could allow annealing at a higher temperature that would drastically reduce annealing times. For example, at an annealing temperature of 175° C., annealing times are 2 hours or less. An obstacle that is overcome by the embodiments herein is identifying that the mechanics of fracture in ABS are complicated by the presence of a secondary rubber-toughening phase, whose characteristic size and distribution can change during printing and/potentially, during post-processing.

A practical feature of the annealed parts is ductile failure, as described above. By comparison, an unannealed ABS L-bracket would have failed if subject to human loading. This fracture would have been sudden and catastrophic, providing no warning or opportunity to avoid failure. In contrast, the annealed PC-shelled L-bracket experimentally developed in accordance with the embodiments herein displayed softening and gradual failure. Therefore, if loading on the bracket was exceeded during use, it is likely that indications of impending failure such as part deformation or partial fracture would be evident. The ability of the techniques provided by the embodiments herein to create tough FFF parts that fail gracefully is a dramatic and significant advance in the industry in enabling FFF parts to be used in practical engineering applications. Furthermore, the experimental annealed SENB and L-bracket specimens exhibited less variability than unannealed specimens indicating that the annealing process may mitigate the flaw sensitive nature of FFF parts by enabling ductile, rather than brittle, failure. Annealing may also heal cracks and flaws created during printing that would serve as stress risers for unannealed parts.

The embodiments herein improve the z-direction strength of FFF parts. The as-printed SENB experimental specimens exhibit brittle interfacial failure, and z-direction strength measurements using typical dogbone specimens exhibit brittle failure along these same interfaces. Therefore, the experimentally demonstrated improvements in interlaminar fracture toughness due to annealing should directly translate into improvements in z-direction strength and interlaminar fatigue resistance. Furthermore, enhanced part toughness and reductions in annealing times may be possible with alternate material selections.

The techniques provided by the embodiments herein create tough thermoplastic parts by printing a supportive high-$T_g$ polymer shell 80 around a low-$T_g$ polymer core 85 that can be thermally annealed to achieve high fracture toughness. Accordingly, the techniques provided by the embodiments herein may enable FFF parts to meet a broader range of engineering application requirements, which normally would be incompatible with conventionally manufactured FFF structures due to their poor inter-layer strength. Because the embodiments herein may use a conventional dual-head 3D FFF printer and feedstock, and a conventional oven, the techniques provided by the embodiments herein are cost effective for various applications including commercial manufacturing.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A method for creating a high strength thermoplastic body, the method comprising:
   providing a first thermoplastic polymer;
   providing a second thermoplastic polymer;
   forming a three-dimensional (3D) solid from the first thermoplastic polymer and the second thermoplastic polymer, wherein the 3D solid comprises a continuous solid structure comprising the second thermoplastic polymer, wherein the first thermoplastic polymer forms an external supporting structure that at least partially envelops the second thermoplastic polymer, and wherein a first flow temperature of the first thermoplastic polymer is at least 10° C. higher than a second flow temperature of the second thermoplastic polymer; and annealing the 3D solid at a temperature below the first flow temperature and above the second flow temperature wherein the 3D solid is formed by a 3D printing process.

2. The method of claim 1, comprising:
exposing the first thermoplastic polymer to a solvent; and
selectively removing the first thermoplastic polymer from the 3D solid.

3. The method of claim 1, wherein the first thermoplastic polymer is configured to be removed from the second thermoplastic polymer by exposure to a selective solvent that does not degrade the second thermoplastic polymer.

4. The method of claim 1, wherein the 3D solid is formed by a fused filament fabrication process.

5. The method of claim 1, comprising:
forming a multi-component first thermoplastic filament comprising a regular geometric arrangement, wherein at least one of component of the multi-component first thermoplastic filament has a flow temperature at least 10° C. higher than a second flow temperature of the second thermoplastic polymer;
feeding the filament into a 3D printer to create a shell of the 3D solid; and
feeding the second thermoplastic polymer into the 3D printer to create a core of the 3D solid.

6. The method of claim 5, comprising:
forming the multi-component first thermoplastic filament via an extrusion process.

7. The method of claim 5, comprising:
forming a preform from multiple thermoplastic components in a first regular geometric arrangement; and
converting the preform into a filament comprising a second regular geometric arrangement that corresponds to the first regular geometric arrangement.

8. The method of claim 5, comprising:
exposing the shell to a solvent; and
selectively removing the shell from the 3D solid.

9. The method of claim 3, wherein in the selective solvent comprises any of water, an organic solvent, an inorganic solvent, limonene, ammonia, supercritical carbon dioxide, an acid, and a base.

10. The method of claim 1, wherein the first thermoplastic polymer comprises any of polyvinyl alcohol (PVA), poly(ethylene oxide) (PEO), poly(ethylene glycol) (PEG), polylactic acid (PLA), high impact polystyrene (HIPS), polyethylene glycol (PEG), polyvinyl pyrrolidone (PVP), poly(vinyl methyl ether), poly-vinyl-pyrrolidone, carboxy-vinyl polymers, poly methacrylic acid, polyacrylic acid (PAA), poly(n-isopropylacrylamide) (PNIPAm), polyacrylamides (PAAmm), N-(2-hydroxypropyl) methacrylamid (HPMA), divinyl ether-maleic anhydride (DIVEMA), polyoxazoline, polyphosphates, polyphsphazenes, cellulose, cellulose ether, pectin, polyether; and copolymers or blends containing one or more of these components.

11. The method of claim 1, wherein the first thermoplastic polymer comprises a multi-component structure.

12. The method of claim 5, wherein the regular geometric arrangement comprises an interlocking geometric arrangement.

13. The method of claim 5, wherein the regular geometric arrangement comprises a periodic geometric arrangement.

14. The method of claim 1, wherein a geometry of the second thermoplastic component at least partially confines the first thermoplastic component so that the second thermoplastic component is restricted from release from a filament structure.

* * * * *